(12) United States Patent
Han et al.

(10) Patent No.: US 10,824,708 B2
(45) Date of Patent: Nov. 3, 2020

(54) METHOD AND SYSTEM FOR AUTHENTICATING STAMP TOUCH

(71) Applicant: 12CM, Seongnam-si (KR)

(72) Inventors: Jeong Gyoun Han, Seongnam-si (KR); Jae Hyung Kim, Seoul (KR); Bong Ki Kwon, Anyang-si (KR)

(73) Assignee: 12CM GLOBAL PTE. LTD., Singapore (SG)

( * ) Notice: Subject to any disclaimer, the term of this patent is extended or adjusted under 35 U.S.C. 154(b) by 0 days.

(21) Appl. No.: 14/443,370

(22) PCT Filed: Nov. 19, 2013

(86) PCT No.: PCT/KR2013/010509
§ 371 (c)(1),
(2) Date: May 15, 2015

(87) PCT Pub. No.: WO2014/077657
PCT Pub. Date: May 22, 2014

(65) Prior Publication Data
US 2015/0293622 A1 Oct. 15, 2015

(30) Foreign Application Priority Data

Nov. 19, 2012 (KR) .................. 10-2012-0130769
Sep. 9, 2013 (KR) .................. 10-2013-0108142
Oct. 8, 2013 (KR) .................. 10-2013-0120202

(51) Int. Cl.
*G06F 21/36* (2013.01)
*H04W 12/06* (2009.01)
(Continued)

(52) U.S. Cl.
CPC .............. *G06F 21/36* (2013.01); *G06F 3/044* (2013.01); *H04L 67/36* (2013.01); *H04W 12/06* (2013.01); *G06F 2203/04104* (2013.01)

(58) Field of Classification Search
None
See application file for complete search history.

(56) References Cited

U.S. PATENT DOCUMENTS 8,310,453 B1   11/2012  Krack et al.
9,152,279 B2 *  10/2015  Moberg ................. G06F 3/044
(Continued)

FOREIGN PATENT DOCUMENTS

EP   0 902 352    3/1999
JP   5-89220      4/1993
(Continued)

OTHER PUBLICATIONS

Extended European Search Report dated Apr. 22, 2016 for European Patent Application No. 13855561.0.
(Continued)

*Primary Examiner* — David D Davis
(74) *Attorney, Agent, or Firm* — Ladas & Parry, LLP

(57) ABSTRACT

There are provided a method and system for authenticating a stamp touch. The method of authenticating a stamp touch according to the invention is executed in a wireless terminal having a capacitive touch screen which supports a multi-touch, the method including, a first operation in which N touch points touching a touch stamp having N (N≥5) touch units made of a conductive material on the capacitive touch screen are recognized, a second operation in which a touch authentication condition set for authenticating a touch using the touch stamp is used to check an authentication result of a geometrical position relation of the N touch points, and a third operation in which a designated service linked with the touch stamp starts when the N touch points are authenticated.

22 Claims, 10 Drawing Sheets

(51) Int. Cl.
    *H04L 29/08*    (2006.01)
    *G06F 3/044*    (2006.01)

(56) References Cited

U.S. PATENT DOCUMENTS

| | | | |
|---|---|---|---|
| 2008/0168403 | A1 | 7/2008 | Westerman et al. |
| 2011/0108625 | A1* | 5/2011 | Lee .................. G06K 19/06 |
| | | | 235/448 |
| 2011/0175816 | A1* | 7/2011 | Shin .................. G06F 3/04883 |
| | | | 345/168 |
| 2011/0216038 | A1* | 9/2011 | Stolov .................. G06F 3/044 |
| | | | 345/174 |
| 2011/0227871 | A1 | 9/2011 | Cannon |
| 2011/0283354 | A1 | 11/2011 | Chang et al. |
| 2012/0017273 | A1* | 1/2012 | Son .................. G06F 21/35 |
| | | | 726/20 |
| 2012/0068962 | A1 | 3/2012 | Yamamoto et al. |
| 2013/0194202 | A1* | 8/2013 | Moberg .................. G06F 3/044 |
| | | | 345/173 |

FOREIGN PATENT DOCUMENTS

| | | |
|---|---|---|
| JP | 11-120311 | 4/1999 |
| JP | 11-149454 | 6/1999 |
| JP | 2001-307102 | 11/2001 |
| JP | 2003-346077 | 12/2003 |
| JP | 2010-282322 | 12/2010 |
| JP | 2011-134298 | 7/2011 |
| JP | 2012-98844 | 5/2012 |
| JP | 2012-118637 | 6/2012 |
| JP | 2012-164272 | 8/2012 |
| JP | 2012-168619 | 9/2012 |

OTHER PUBLICATIONS

International Preliminary Report on Patentability (Chapter I) for PCT/KR2013/010509 dated May 19, 2015.
Written Opinion of the International Searching Authority for PCT/KR2013/010509 dated Feb. 25, 2014.
International Search Report for PCT/KR2013/010509 dated Feb. 25, 2014.
Office Action dated Jul. 19, 2016 for Japanese Patent Application No. 2015-542959 and its English translation provided by Applicant's foreign counsel.
Takahiko Ebisu, "Personal Authentication System Using the Acoustic Signal", Oki Technical Review, Oki Electric Industry Co., Ltd., Jan. 1, 2006, No. 205, vol. 73, No. pp. 1, 52-55.
Office Action dated Jan. 25, 2017 for Chinese Patent Application No. 201380065070.9 and its English machine translation by Google Translate.
Office Action dated Aug. 2, 2017 for Chinese Patent Application No. 201380065070.9 and its English machine translation by Google Translate.
Appeal Decision dated May 29, 2018 for Japanese Patent Application No. 2015-542959 and its English machine translation by Google Translate.
Office Action dated Jul. 3, 2018 for Japanese Patent Application No. 2017-121442 and its English machine translation by Global Dossier.
Office Action dated Apr. 2, 2019 for Japanese Patent Application No. 2017-121442 and its English translation provided by Applicant's foreign council.

* cited by examiner

[Fig. 1]
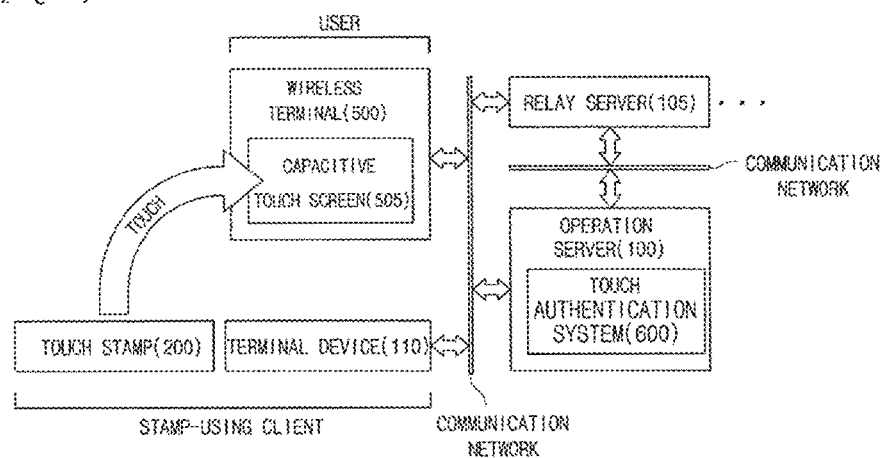
[Fig. 2A]
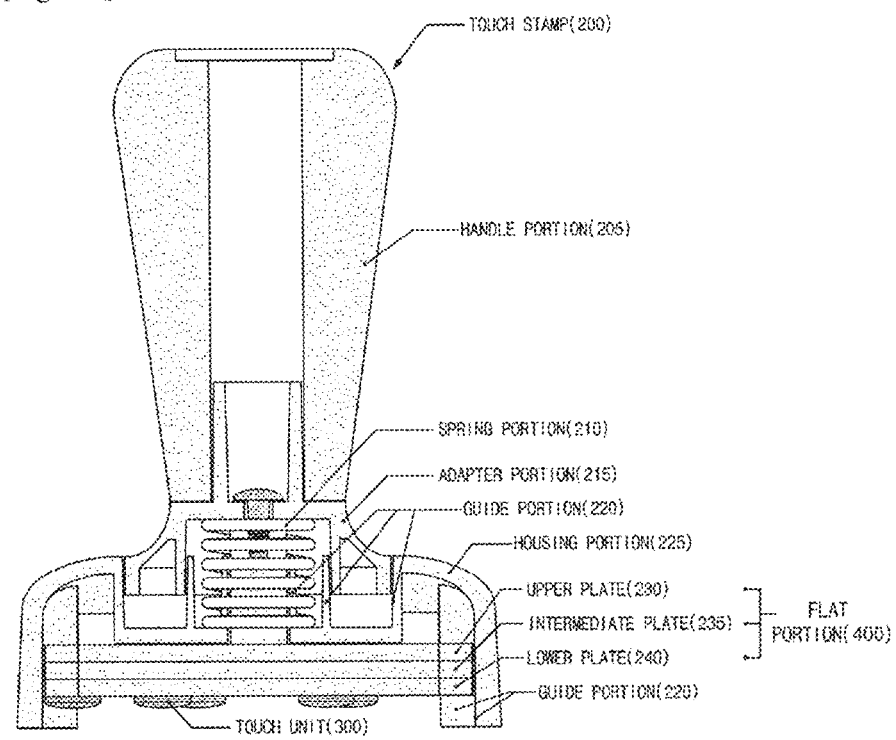

[Fig. 2B]
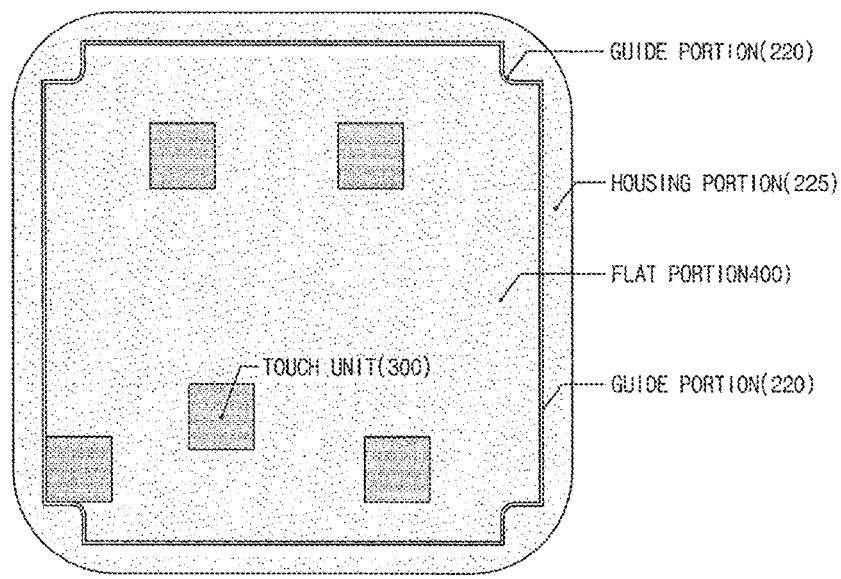
[Fig. 3A]
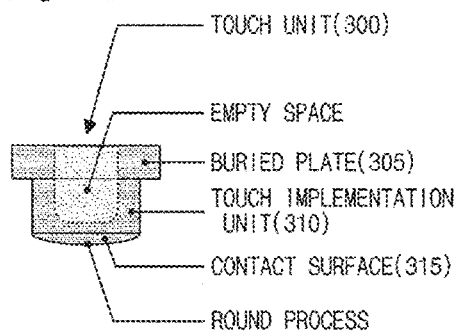
[Fig. 3B]
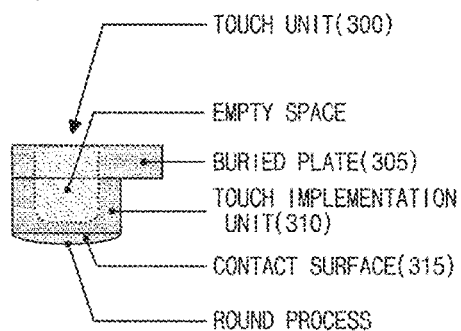

[Fig. 4A]
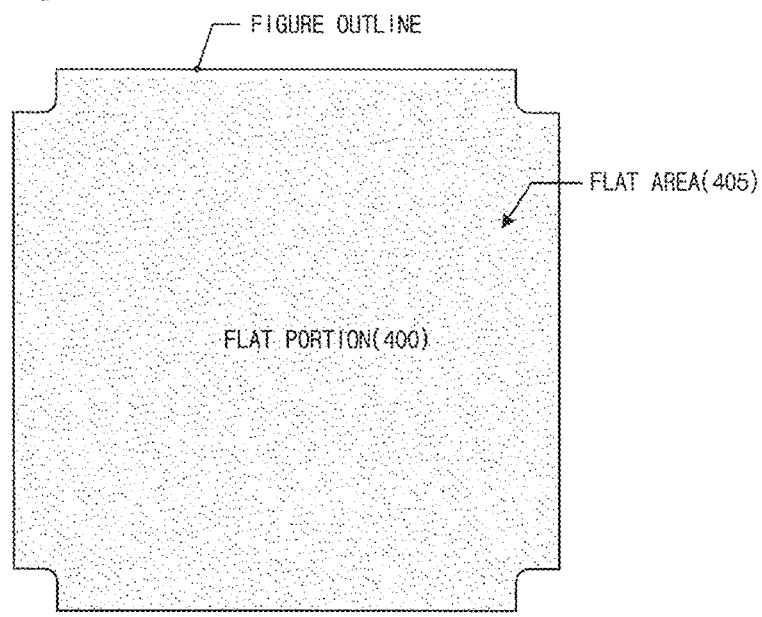
[Fig. 4B]
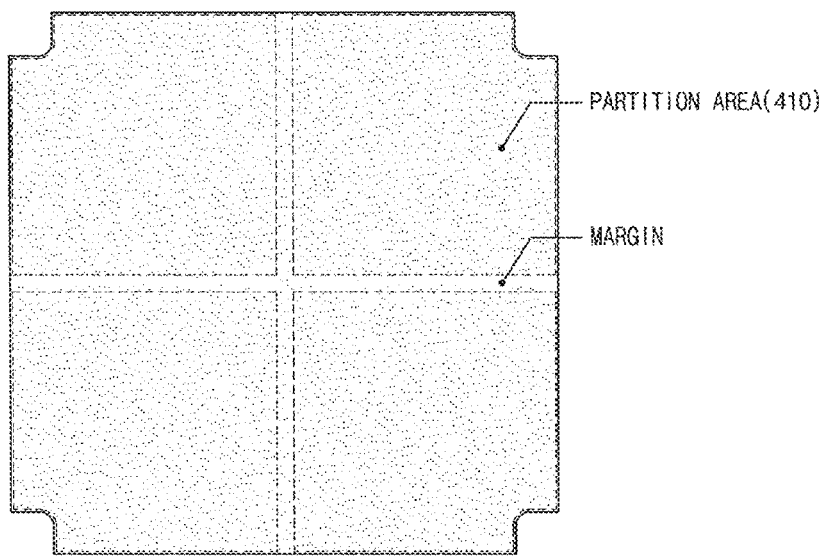

[Fig. 4C]
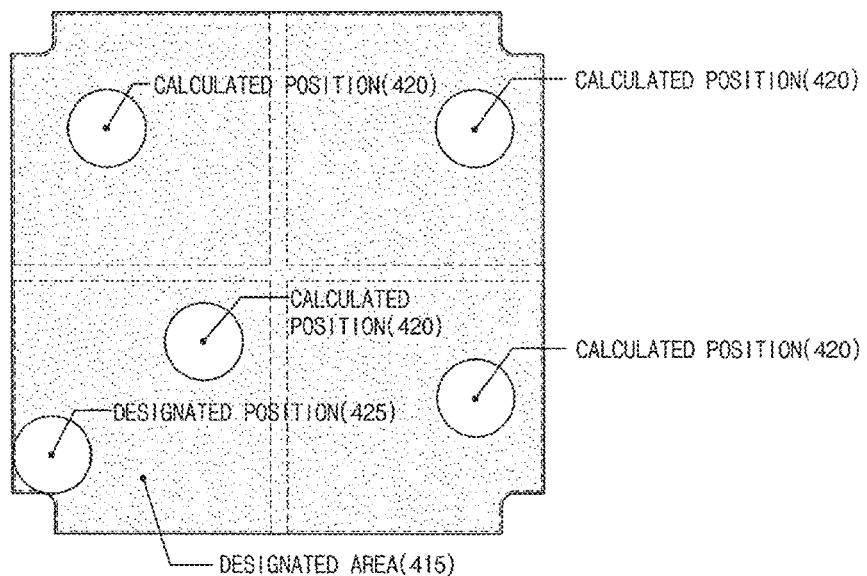
[Fig. 4D]
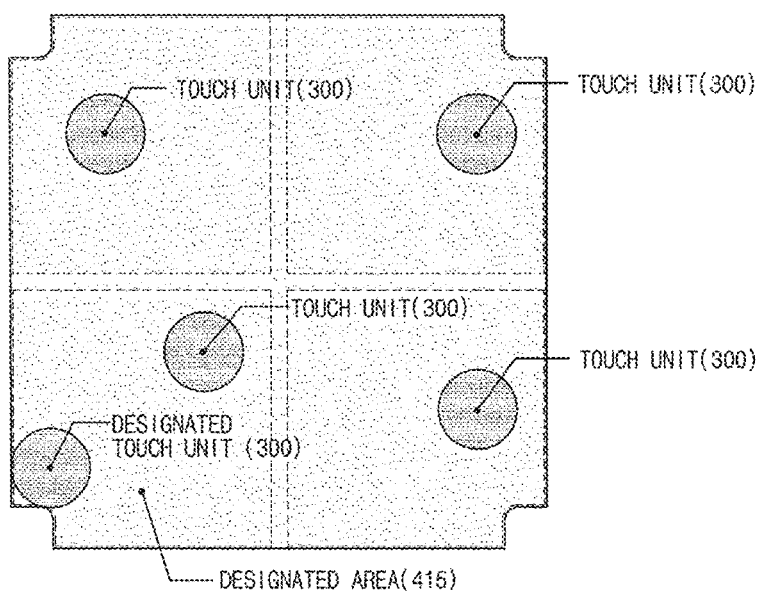

[Fig. 5]
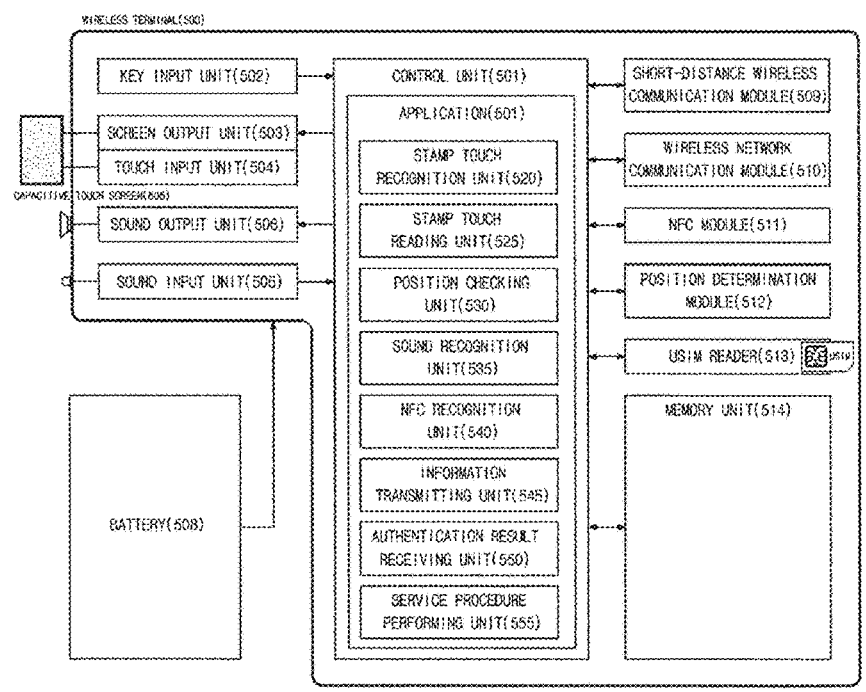
[Fig. 6]
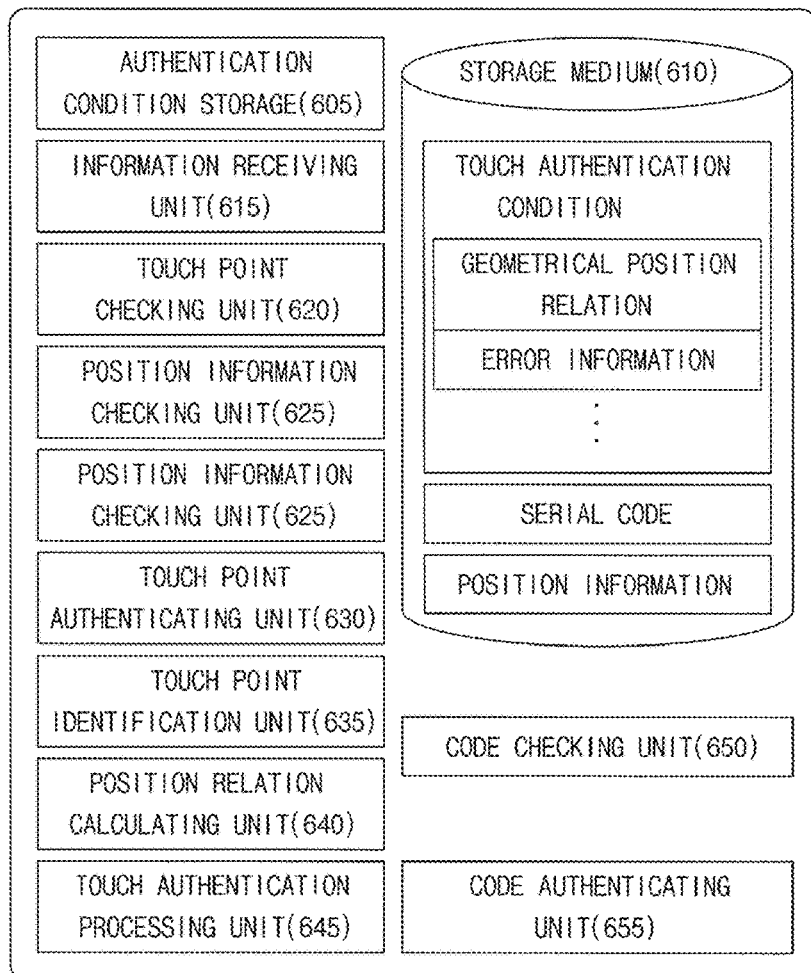

[Fig. 7]
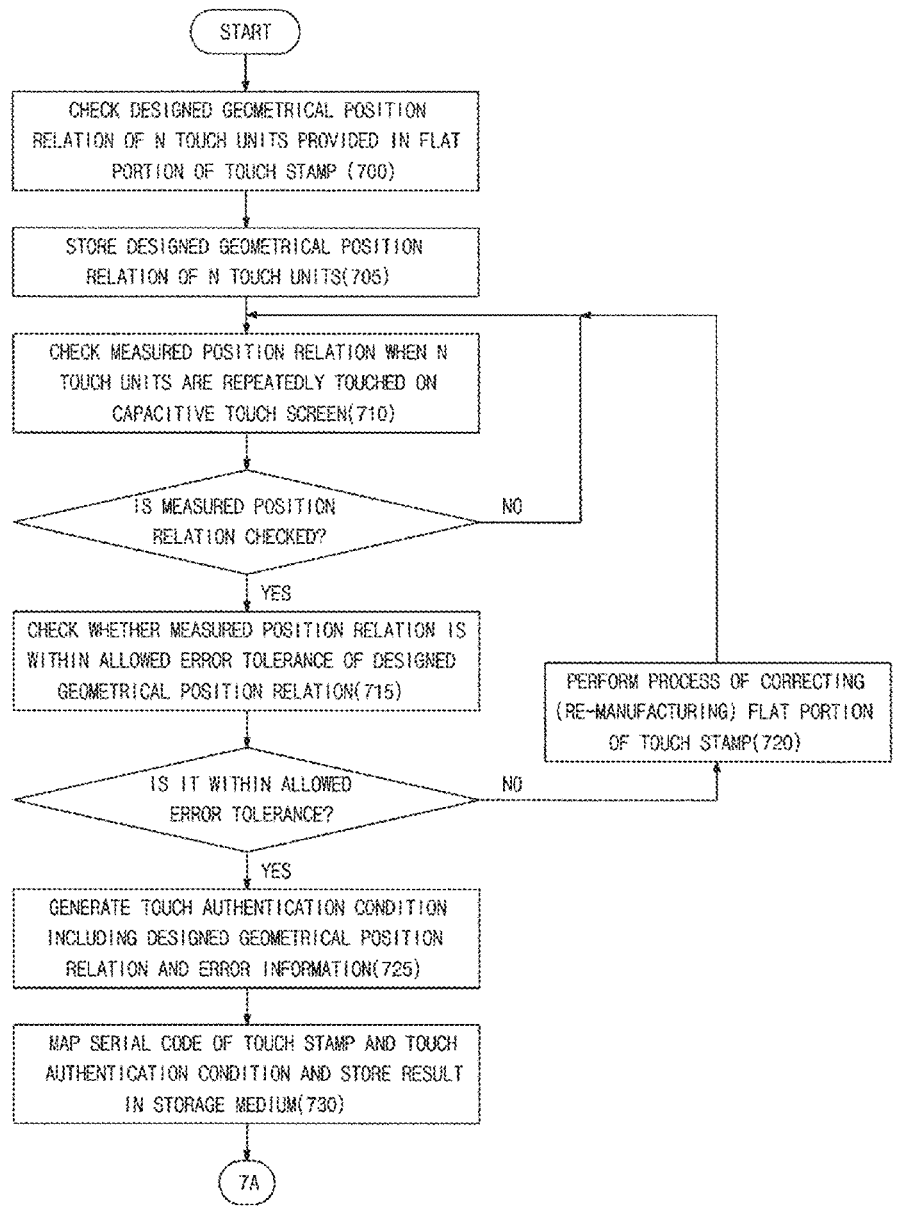

[Fig. 8]
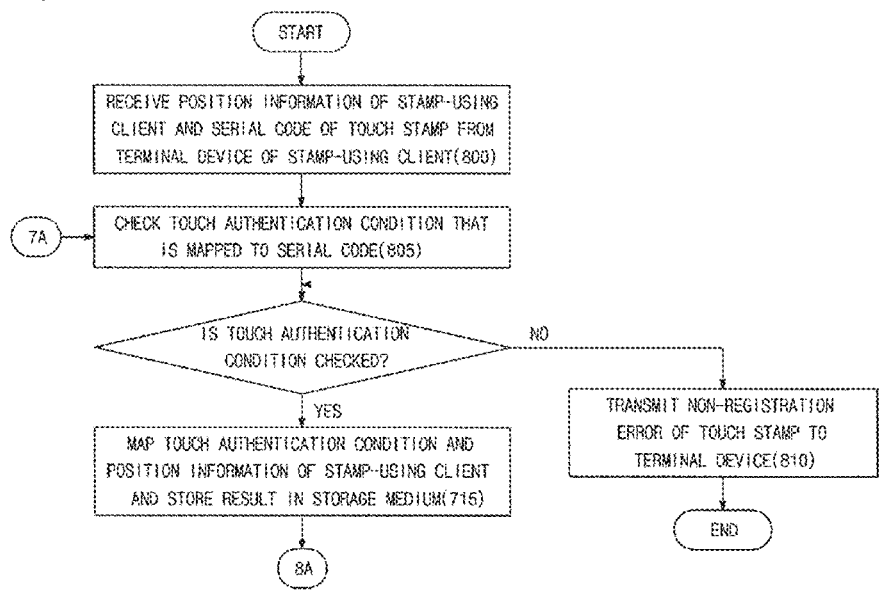

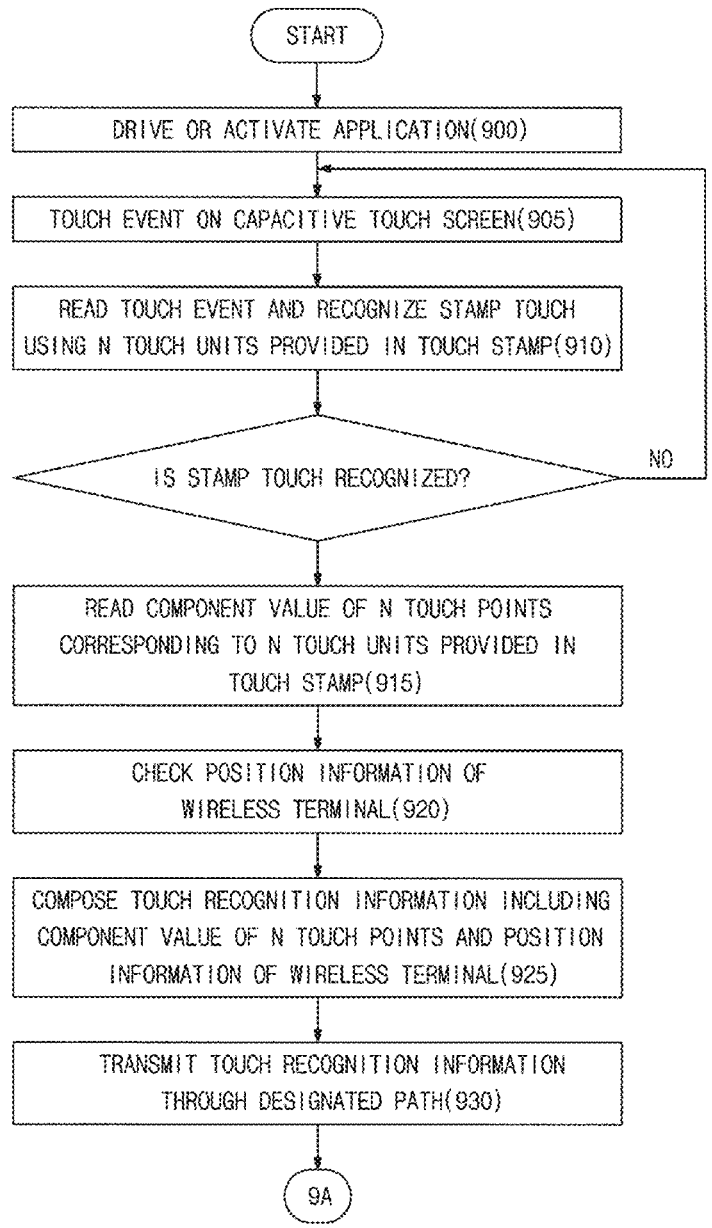
[Fig. 9]

[Fig. 10]
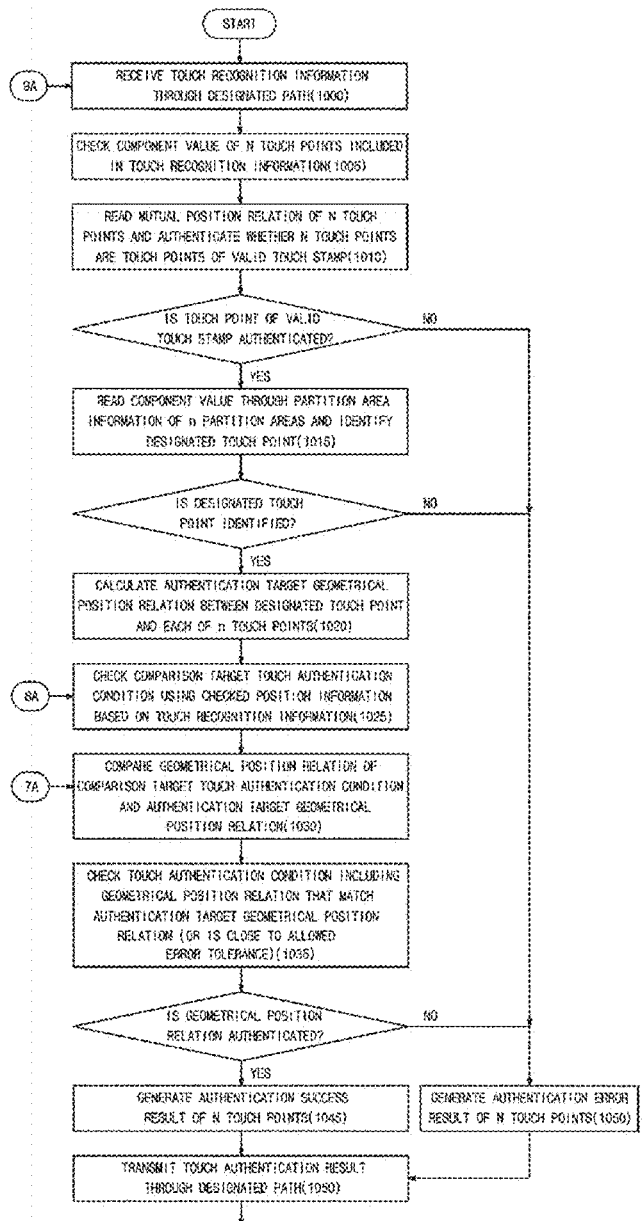

[Fig. 11]
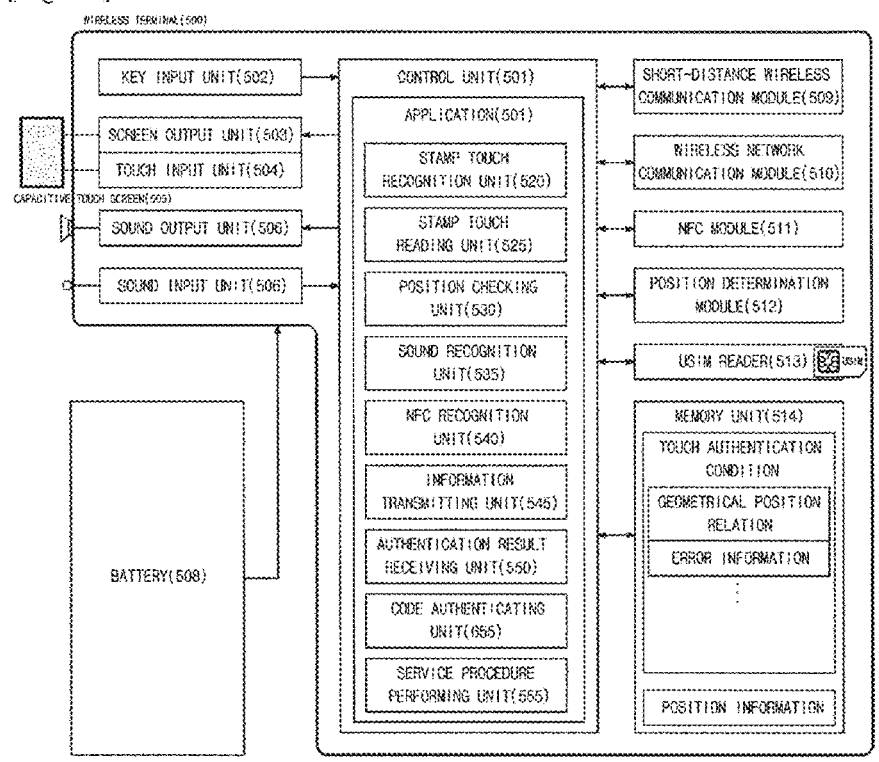

METHOD AND SYSTEM FOR AUTHENTICATING STAMP TOUCH

CROSS-REFERENCE TO RELATED APPLICATION(S)

This application is the U.S. National Stage of International Patent Application No. PCT/KR2013/010509 filed on Nov. 19, 2013, which claims priority to Korean Patent Application Nos. 10-2012-0130769 filed on Nov. 19, 2012, 10-2013-0108142 filed on Sep. 9, 2013, and 10-2013-0120202 filed on Oct. 8, 2013, the disclosures of which are hereby incorporated in their entireties by reference.

TECHNICAL FIELD

The present invention relates to a method and system in which a touch stamp having N (N≥5) touch units made of a conductive material is touched on a capacitive touch screen of a wireless terminal, and authentication of whether a geometrical position relation of N touch points that are touched on the capacitive touch screen using the N touch units matches a designed geometrical position relation of the N touch units registered in the course of designing or manufacturing the touch stamp.

BACKGROUND ART

Recently, with the proliferation of smart phones, capacitive touch screens are being provided in a users' wireless terminals. The capacitive touch screen may provide an accurate touch input of a finger touch using a capacitance accumulated in a human body without degrading image quality compared to a resistive touch screen.

Meanwhile, the capacitive touch screen included in the wireless terminal is designed and optimized for a touch of a user's finger to be used as an input means. In recently released smart phones, the capacitive touch screen supports a multi-touch and is designed to use a multi-touch using fingers as an input device (for example, pinch to zoom).

Meanwhile, in order to use a geometrical position relation of a plurality of touch units provided in a stamp as a means of authentication or identification, geometrical position relations of a plurality of touch units provided in different stamps should have different characteristics. In addition, convenience that enables the touch units of such a stamp to be recognized and authenticated whenever the units are touched on the capacitive touch screen in any position or in any direction is also necessary. However, it is difficult to provide the unique characteristics and convenience of the stamp to be used as the authentication or identification means using only a multi-touch method that is optimized as an input means in the related art.

DISCLOSURE OF INVENTION

Technical Problem

In view of the above-described problems, the invention provides a method and system for authenticating a stamp touch. Touch stamps each having N (N≥5) touch units are made of a conductive material, and each touch stamp is designed and manufactured to have a different geometrical position relation of the N touch units. When the touch units of the designed and manufactured touch stamp are touched on a capacitive touch screen of a wireless terminal, a stamp touch using the touch stamp is recognized. It is authenticated whether N touch points corresponding to the recognized stamp touch match a designed geometrical position relation of the N touch units provided in the touch stamp. In this way, it is possible to provide a designated service when the touch stamp is touched on the capacitive touch screen of the wireless terminal.

The invention also provides a method or system for authenticating a stamp touch. A flat portion of the touch stamp is divided into n (n≥4) partition areas in a design stage, each touch unit is fixed in a calculated position in the n partition areas, and one touch unit is fixed in a designated position in any one designated area out of the n partition areas. Based on partition area information, a designated touch point provided in the designated position in the designated area in which two touch points are touched out of the n partition areas is identified. Based on the identified designated touch point, a geometrical position relation of the N touch points is compared with a designed geometrical position relation of the N touch units provided in the touch stamp. In this way, it is possible to authenticate whether the geometrical position relation of the N touch points matches the designed geometrical position relation when the touch stamp is touched on the capacitive touch screen in any direction.

Solution to Problem

According to an aspect of the invention, there is provided a method of authenticating a stamp touch. The method includes a first operation in which N touch points touching a touch stamp having N (N≥5) touch units made of a conductive material on the capacitive touch screen are recognized, a second operation in which a touch authentication condition set for authenticating a touch using the touch stamp is used to check an authentication result of a geometrical position relation of the N touch points, and a third operation in which a designated service linked with the touch stamp starts when the N touch points are authenticated.

The method may further include checking whether the number of touch points is N when two or more touch points are touched while a touch point is not touched through the capacitive touch screen, and determining the N touch points as touch points that are simultaneously touched by the touch stamp when the number of checked touch points is N.

The method may further include repeatedly recognizing two or more touch points when the points are recognized through the capacitive touch screen in a designated time interval, checking whether the number of touch points that are touched within a designated certain time from when the two or more touch points are initially recognized is N, and determining the N touch points as touch points that are simultaneously touched by the touch stamp when the number of touch points checked within the certain time is N.

The method may further include repeatedly recognizing N touch points recognized through the capacitive touch screen in a designated time interval, checking whether the number of touch points that are repeatedly recognized for the certain time is N, and determining the N touch points as touch points that are touched by a behavior habit of stamping the touch stamp when the number of repeatedly checked touch points is N.

The method may further include repeatedly recognizing N touch points recognized through the capacitive touch screen in a designated time interval, repeatedly checking positions of the repeatedly recognized N touch points, comparing the positions of the repeatedly checked N touch points for each touch point and checking whether the positions of the N touch points are changed, and determining the N touch points as touch points that are touched by a behavior habit of stamping the touch stamp when the positions of the N touch points are not changed.

The method may further include repeatedly recognizing N touch points recognized through the capacitive touch screen in a designated time interval, repeatedly checking a position relation of the repeatedly recognized N touch points, comparing the position relation of the repeatedly checked N touch points and checking whether the position relation of the N touch points maintains a static state without change, and determining the N touch points as touch points that touch N touch units fixedly mounted on the touch stamp when the position relation of the N touch points maintains a static state.

The method may further include repeatedly recognizing N touch points recognized through the capacitive touch screen in a designated time interval, repeatedly checking positions of the repeatedly recognized N touch points, comparing positions of the repeatedly checked N touch points and checking whether a position relation of the N touch points has a dynamic state that is changed based on a designated rule, and determining the N touch points as touch points that are touched using the touch stamp having N touch units which are movably designed and manufactured based on the designated rule when the position relation of the N touch points has a dynamic state.

The method may further include repeatedly recognizing touch points that are touched on the capacitive touch screen from when at least one touch point is recognized through the capacitive touch screen, repeatedly checking the number and positions of touch points while the touch points are repeatedly recognized, reading a change of the number of repeatedly checked touch points and positions of the touch points, and checking whether the N touch points are sequentially touched based on the designated rule, and determining the N touch points as touch points that are touched using the touch stamp having N touch units which are designed and manufactured to be sequentially touched based on the designated rule when the N touch points are sequentially touched based on the designated rule.

The method may further include reading a component value of the N touch points recognized through the capacitive touch screen, and transmitting touch recognition information including the read component value to an operation server over a network through a designated path, wherein in the second operation, a touch authentication result of authenticating the geometrical position relation of the N touch points may be received from the operation server through the designated path.

The method may further include setting and storing a minimum-distinction-recognition distance in which the N touch units provided in the touch stamp can be distinctly recognized as different touch points, and calculating a distance between the N touch points touched on the capacitive touch screen using a component value included in the touch recognition information, and authenticating whether the calculated distance between the N touch points is over the minimum-distinction-recognition distance.

The method may further include storing a touch authentication condition including a designed geometrical position relation of the N touch units provided in the touch stamp, reading a component value of N touch points recognized through the capacitive touch screen, calculating a geometrical position relation of the N touch points touched on the capacitive touch screen using the component value, and comparing the designed geometrical position relation included in the touch authentication condition and the calculated geometrical position relation for authentication.

The designed geometrical position relation may include a coordinate relation of the N touch units that are fixed in a flat portion of the touch stamp in the course of designing or manufacturing the touch stamp. The designed geometrical position relation may include a distance relation and an angle relation of the N touch units that are fixed in a flat portion of the touch stamp in the course of designing or manufacturing the touch stamp.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a coordinate relation between n touch points and the touch point fixed in a designated position in the designated area.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a distance relation and an angle relation between n touch points and the touch point fixed in a designated position in the designated area.

The method may further include checking position information of the wireless terminal using a position determination module of the wireless terminal and checking a touch authentication condition that is mapped with position information that matches the position information of the wireless terminal and stored out of touch authentication conditions stored in the storage medium as a comparison target touch authentication condition, wherein the touch authentication condition may be mapped with position information of a stamp-using client provided with the touch stamp and stored.

The method may further include reading a mutual position relation between N touch points using the read component value, and authenticating whether the mutual position relation between the touch points includes a position relation that can be formed by touching touch units of the designed and manufactured touch stamp on the capacitive touch screen, wherein the touch stamp may be designed and manufactured such that a flat area of a flat portion is divided into n (n≥4) partition areas in a design stage, and then each touch unit is fixed in a calculated position in each partition area and one touch unit is fixed in a designated position in one designated area out of the n partition areas.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the authenticating may include, matching the read component value with partition area information of the n partition areas and identifying a touch point corresponding to a designated position in a designated area in which two touch points are present in the n partition areas as a designated touch point The authenticating may further include an operation of comparably matching the component value with the designed geometrical position relation included in the touch authentication condition by performing coordinate rotation of the n touch points based on the designated touch point.

The authenticating may further include calculating an authentication target geometrical position relation including a distance relation and an angle relation between the designated touch point and the n touch points, and comparing the calculated authentication target geometrical position relation and the designed geometrical position relation included in the touch authentication condition and authenticating whether a result thereof matches or is close to an allowed error tolerance.

The method may further include recognizing a unique code or a single-use code included in a sound signal output from the touch stamp, and authenticating validity of the recognized unique code or single-use code using an authentication condition of the touch authentication condition, wherein the touch authentication condition may further include an authentication condition for authenticating a unique code or a single-use code encoded in a sound signal output through a sound output function provided in the touch stamp, and the second operation may include checking a touch authentication result in which an authentication result of the N touch points and an authentication result of the unique code or single-use code are combined.

The method may further include recognizing a unique code or a single-use code encoded in a radio frequency signal transmitted through an NFC chip of the touch stamp, and authenticating validity of the recognized unique code or single-use code using an authentication condition of the touch authentication condition, wherein the touch authentication condition may further include an authentication condition for authenticating a unique code or a single-use code encoded in a radio frequency signal transmitted through an NFC chip included in the touch stamp and the second operation may include checking a touch authentication result in which an authentication result of the N touch points and an authentication result of the unique code or the single-use code are combined.

According to another aspect of the invention, there is provided a method of authenticating a stamp touch that is executed in an operation server capable of receiving touch recognition information of a touch point touched on a capacitive touch screen provided in a wireless terminal, the method including a first operation in which a touch authentication condition including a designed geometrical position relation of N (N≥5) touch units that are made of a conductive material and are provided in a touch stamp is stored in a storage medium, a second operation in which touch recognition information including a component value of the N touch units that are provided in the touch stamp and are touched on the capacitive touch screen of the wireless terminal is received, a third operation in which an authentication target geometrical position relation of N touch points touched on the capacitive touch screen of the wireless terminal using the component value included in the touch recognition information is calculated, a fourth operation in which a designed geometrical position relation included in the touch authentication condition and the calculated authentication target geometrical position relation are compared for authentication, and a fifth operation in which a touch authentication result of authenticating the N touch points is transmitted to the wireless terminal through a designated path.

The component value may include a coordinate value in a coordinate system corresponding to the capacitive touch screen.

The method may further included setting and storing a minimum-distinction-recognition distance in which the N touch units provided in the touch stamp can be distinctly recognized as different touch points, and calculating a distance between the N touch points touched on the capacitive touch screen of the wireless terminal using a component value included in the touch recognition information and authenticating whether the calculated distance between the N touch points is over the minimum-distinction-recognition distance.

The designed geometrical position relation may include a coordinate relation of the N touch units that are fixed in a flat portion of the touch stamp in the course of designing or manufacturing the touch stamp. The designed geometrical position relation may include a distance relation and an angle relation of the N touch units that are fixed in a flat portion of the touch stamp in the course of designing or manufacturing the touch stamp.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a coordinate relation between n touch points and the touch point fixed in a designated position in the designated area.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a distance relation and an angle relation between n touch points and the touch point fixed in a designated position in the designated area.

The method may further include checking position information of the wireless terminal that has transmitted the touch recognition information, and checking a touch authentication condition that is mapped with position information that matches the position information of the wireless terminal and stored out of touch authentication conditions stored in the storage medium as a comparison target touch authentication condition, wherein the touch authentication condition may be mapped with position information of a stamp-using client provided with the touch stamp and stored.

The method may further include reading a mutual position relation between N touch points using the component value included in the touch recognition information, and authenticating whether the mutual position relation between the touch points includes a position relation that can be formed by touching touch units of the designed and manufactured touch stamp on the capacitive touch screen, wherein the touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the fourth operation may include, matching the component value included in the touch recognition information with partition area information of the n partition areas and identifying a touch point corresponding to a designated position in a designated area in which two touch points are present in the n partition areas as a designated touch point.

The fourth operation may include an operation of comparably matching the component value with the designed geometrical position relation included in the touch authentication condition by performing coordinate rotation of the n touch points based on the designated touch point.

The fourth operation may further include, calculating an authentication target geometrical position relation including a distance relation and an angle relation between the designated touch point and the n touch points, and comparing the calculated authentication target geometrical position relation and the designed geometrical position relation included in the touch authentication condition and authenticating whether a result thereof matches or is close to an allowed error tolerance.

The method may further include, when the touch recognition information includes a unique code or a single-use code encoded in the sound signal, checking the unique code or the single-use code included in the touch recognition information, and authenticating validity of the checked unique code or single-use code using an authentication condition of the touch authentication condition, wherein the touch authentication condition may further include an authentication condition for authenticating a unique code or a single-use code encoded in a sound signal output through a sound output function provided in the touch stamp, and the fifth operation may further include an operation of generating a touch authentication result in which an authentication result of the N touch points and an authentication result of the unique code or single-use code are combined.

The method may further include, when the touch recognition information includes a unique code or a single-use code received from the NFC chip, checking the unique code or the single-use code included in the touch recognition information, and authenticating validity of the checked unique code or single-use code using an authentication condition of the touch authentication condition, wherein the touch authentication condition may further include an authentication condition for authenticating a unique code or a single-use code encoded in a radio frequency signal transmitted through an NFC chip included in the touch stamp, the fifth operation may further include an operation of generating a touch authentication result in which an authentication result of the N touch points and an authentication result of the unique code or single-use code are combined.

According to still another aspect of the invention, there is provided a system for authenticating a stamp touch that is implemented in an operation server capable of receiving touch recognition information of a touch point touched on a capacitive touch screen provided in a wireless terminal. The system includes an authentication condition storage configured to store a touch authentication condition including a designed geometrical position relation of N (N≥5) touch units that are provided in the touch stamp and made of a conductive material in a storage medium, an information receiving unit configured to receive touch recognition information including a component value of the N touch units that are provided in the touch stamp and are touched on the capacitive touch screen of the wireless terminal, a position relation calculating unit configured to calculate an authentication target geometrical position relation of N touch points touched on the capacitive touch screen of the wireless terminal using the component value included in the touch recognition information, and a touch authentication processing unit configured to compare a designed geometrical position relation included in the touch authentication condition and the calculated authentication target geometrical position relation for authentication, and transmit a touch authentication result of authenticating the N touch points to the wireless terminal through a designated path.

The component value may include a coordinate value in a coordinate system corresponding to the capacitive touch screen.

The system may further include a touch point authenticating unit configured to calculate a distance between the N touch points touched on the capacitive touch screen using the component value included in the touch recognition information and authenticate whether the calculated distance between the N touch points is over the minimum-distinction-recognition distance, wherein the authentication condition storage may set and store a minimum-distinction-recognition distance in which the N touch units provided in the touch stamp can be distinctly recognized as different touch points.

The designed geometrical position relation may include a coordinate relation of the N touch units that are fixed in a flat portion of the touch stamp in the course of designing or manufacturing the touch stamp. The designed geometrical position relation may include a distance relation and an angle relation of the N touch units that are fixed in a flat portion of the touch stamp in the course of designing or manufacturing the touch stamp.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a coordinate relation between n touch points and the touch point fixed in a designated position in the designated area.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the designed geometrical position relation may include a distance relation and an angle relation between n touch points and the touch point fixed in a designated position in the designated area.

The system may further include a position information checking unit configured to check position information of the wireless terminal that has transmitted the touch recognition information, wherein a touch authentication condition may be mapped with position information of a stamp-using client provided with the touch stamp and stored, and the touch authentication processing unit may check the touch authentication condition mapped with position information that matches the position information of the wireless terminal and stored out of touch authentication conditions stored in the storage medium as a comparison target touch authentication condition The system may further include a touch point authenticating unit configured to read a mutual position relation between N touch points using the component value included in the touch recognition information and authenticate whether the mutual position relation between the touch points includes a position relation that can be formed by touching touch units of the designed and manufactured touch stamp on the capacitive touch screen, wherein the touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas.

The touch stamp may be designed and manufactured such that a flat area of a flat portion is divided into n (n≥4) partition areas in a design stage, each touch unit is fixed in a calculated position in each partition area, and one touch unit is fixed in a designated position in one designated area out of the n partition areas, and the touch authentication processing unit may match the component value included in the touch recognition information with partition area information of the n partition areas and identifies a touch point corresponding to a designated position in a designated area in which two touch points are present in the n partition areas as a designated touch point.

The touch authentication processing unit may comparably match the component value with the designed geometrical position relation included in the touch authentication condition by performing coordinate rotation of the n touch points based on the designated touch point.

The touch authentication processing unit may calculate an authentication target geometrical position relation including a distance relation and an angle relation between the designated touch point and the n touch points, compare the calculated authentication target geometrical position relation and the designed geometrical position relation included in the touch authentication condition and authenticate whether a result thereof matches or is close to an allowed error tolerance.

The system may further include, when the touch recognition information includes a unique code or a single-use code encoded in the sound signal, a code checking unit configured to check the unique code or the single-use code included in the touch recognition information, and a code authenticating unit configured to authenticate validity of the checked unique code or single-use code using an authentication condition of the touch authentication condition, wherein the touch authentication condition may further include an authentication condition for authenticating a unique code or a single-use code encoded in a sound signal output through a sound output function provided in the touch stamp, and the touch authentication processing unit may generate a touch authentication result in which an authentication result of the N touch points and an authentication result of the unique code or single-use code are combined.

The system may further include, when the touch recognition information includes a unique code or a single-use code received from the NFC chip, a code checking unit configured to check the unique code or the single-use code included in the touch recognition information, and a code authenticating unit configured to authenticate validity of the checked unique code or single-use code using an authentication condition of the touch authentication condition, wherein the touch authentication condition may further include an authentication condition for authenticating a unique code or a single-use code encoded in a radio frequency signal transmitted through an NFC chip included in the touch stamp, and the touch authentication processing unit may further include an operation of generating a touch authentication result in which an authentication result of the N touch points and an authentication result of the unique code or single-use code are combined.

Advantageous Effects of Invention

According to the invention, using an act of touching the touch stamp on the capacitive touch screen provided in the user's wireless terminal, it is possible to provide various services corresponding to authentication of a designated act that has been performed or is to be performed in a designated position or place by the user.

According to the invention, when the touch stamp having N touch units is touched on the capacitive touch screen in any direction freely, it is possible to authenticate the geometrical position relation of N touch points corresponding to the N touch units by comparing it with the pre-registered designed geometrical position relation.

BRIEF DESCRIPTION OF DRAWINGS

FIG. 1 is a schematic diagram illustrating a configuration of an entire system that provides touch authentication using a touch stamp.

FIGS. 2A and 2B are diagrams illustrating a structure of the touch stamp.

FIGS. 3A and 3B are diagrams illustrating a side structure of an exemplary touch unit fixed in a flat portion of the touch stamp.

FIGS. 4A to 4D are diagrams illustrating an exemplary flat area of the flat portion of the touch stamp.

FIG. 5 is a diagram illustrating a configuration of a wireless terminal and application functions provided in the wireless terminal according to a first embodiment of the invention.

FIG. 6 is a diagram illustrating a configuration of a touch authentication system according to the first embodiment of the invention.

FIG. 7 is a flowchart illustrating a process of registering a touch authentication condition of the touch stamp in the touch authentication system.

FIG. 8 is a flowchart illustrating a process of registering and linking between the touch authentication condition of the touch stamp and a stamp-using client in the touch authentication system.

FIG. 9 is a flowchart illustrating a process of recognizing a stamp touch using the touch stamp in an application of the wireless terminal.

FIG. 10 is a flowchart illustrating a process of authenticating a stamp touch when N touch units provided in the touch stamp are touched on a capacitive touch screen.

FIG. 11 is a diagram illustrating a configuration of a wireless terminal and application functions provided in the wireless terminal according to a second embodiment of the invention.

MODE FOR THE INVENTION

Hereinafter, operation principles of exemplary embodiments of the invention will be described in detail with reference to the accompanying drawings. The following drawings and descriptions deal with exemplary methods among a plurality of methods of effectively describing features of the invention, and the invention is not limited to the following drawings and descriptions. For example, a component provided in a server side may be implemented in a wireless terminal side. Alternatively, a component provided in the wireless terminal side may be implemented in the server side.

When it is deemed that detailed descriptions of related well-known functions and configurations might obscure the subject matter of the embodiments, those detailed descriptions will be omitted. Some terms used herein are defined by considering functions in the invention, and meanings may vary depending on, for example, a user or operator's intentions or customs. Therefore, the meanings of terms used in the invention should be interpreted based on the scope throughout this specification.

As a result, the spirit and scope of the invention is defined by the appended claims. The following embodiments are only made to efficiently describe the progressive technological scope of the invention to those skilled in the art.

FIG. 1 is a schematic diagram illustrating a configuration of an entire system that provides touch authentication using a touch stamp 200.

More specifically, FIG. 1 is a schematic diagram illustrating a configuration of a system in which, when the touch stamp 200 including N (N≥5) touch units 300 made of a rubber-elastic conductive material is touched on a capacitive touch screen 505 provided in a user's wireless terminal 500, authentication of whether a geometrical position relation of N touch points touched on the capacitive touch screen 505 matches a designed geometrical position relation of the N touch units 300 provided in the touch stamp 200 is performed.

The system according to the invention includes the touch stamp 200 having the N touch units 300, which are made of a conductive material and are arranged and fixed to have a designed geometrical position relation, and the wireless terminal 500 having the capacitive touch screen 505 on which the N touch units 300 provided in the touch stamp 200 are touched. The wireless terminal 500 is held by a user who will be provided with a service. The touch stamp 200 is provided for a stamp-using client (for example, a franchise who provides a service using a stamp touch or a stamp purchaser) who will provide a service to the user. Therefore, the touch stamp 200 is used to identify or authenticate the stamp-using client. Preferably, the stamp-using client may use a terminal device 110 for providing a service using the touch stamp 200.

According to a first embodiment of the invention, the wireless terminal 500 may recognize N touch points using the capacitive touch screen 505 and transmit information on the recognized N touch points to a designated operation server 100. The N touch point information may be transmitted from the wireless terminal 500 to the operation server 100 via a communication network or transmitted to the operation server 100 through a designated relay server 105. The operation server 100 may receive the N touch point information and compare a designed geometrical position relation of the touch unit 300 provided in the plurality of pre-registered touch stamps 200 and a geometrical position relation formed by the received N touch points. When the geometrical position relation formed by the N touch points matches or is close to any one geometrical position relation out of the designed geometrical position relations of the touch unit 300 provided in each of the plurality of pre-registered touch stamps 200 within an allowed error tolerance, the operation server 100 may authenticate the N touch points touched on the capacitive touch screen 505 as touch points touching the N touch units 300 provided in the specific touch stamp 200 out of the plurality of pre-registered touch stamps 200.

According to a second embodiment of the invention, a wireless terminal 500 may recognize N touch points using the capacitive touch screen 505, check a geometrical position relation formed by the recognized N touch points, and compare the checked geometrical position relation and a designed geometrical position relation of the touch unit 300 of the pre-registered specific touch stamp 200. When the geometrical position relation formed by the N touch points matches or is close to a designed geometrical position relation of the touch unit 300 of the pre-registered specific touch stamp 200 within an allowed error tolerance, the wireless terminal 500 may authenticate the N touch points touched on the capacitive touch screen 505 as touch points touched on the N touch units 300 provided in the registered specific touch stamp 200.

FIGS. 2A and 2B are diagrams illustrating a structure of the touch stamp 200.

FIG. 2A is a diagram illustrating an exemplary cutting surface of a side surface while the touch stamp 200 is standing on the floor in order to describe an internal structure of the touch stamp 200. FIG. 2B is a diagram illustrating an exemplary bottom surface of the touch stamp 200.

The touch stamp 200 according to the invention includes a handle portion 205 that can be grasped by a user's hand, N (N≥5) touch units 300 made of a rubber-elastic conductive material, a flat portion 400 in which the N touch units 300 are fixed in a designed position on a flat area 405, and an adapter portion 215 that physically connects the handle portion 205 and the flat portion 400 and electrically connects the N touch units 300 fixed in the flat portion 400 and the handle portion 205.

The handle portion 205 is made of a conductive material capable of delivering a user's capacitance or the conductive material is applied or plated thereon. The conductive material of the handle portion 205 is electrically connected to the N touch units 300. The handle portion 205 may be manufactured in various designs depending on requirements of the stamp-using client that uses the touch stamp 200.

The touch unit 300 is a collective name for elements forming one touch point when the touch stamp 200 is touched on the capacitive touch screen 505 and is made of a rubber-elastic conductive material. The touch unit 300 may be made of, for example, a conductive rubber material or conductive plastic material.

The touch unit 300 is designed and manufactured to have a designated figure shape (for example, a polygonal or circular shape) of a contact surface 315. For example, the contact surface 315 may be designed and manufactured to have a rectangular shape as illustrated in FIG. 2B or a circular contact surface 315 may be designed and manufactured as illustrated in FIG. 4C.

The contact surface 315 of the touch unit 300 includes a contact area that is designed and calculated to be validly touched on the capacitive touch screen 505. Based on the user's capacitance delivered to the handle portion 205, the contact area is calculated as an area equal to or larger than an area that corresponds to touch sensitivity capable of recognizing a capacitive touch using the touch unit 300 as one valid touch point in the plurality of capacitive touch screens 505 to be touched. When the touch unit 300 of the touch stamp 200 is designed to touch a different type of the capacitive touch screen 505 and touch sensitivity of each capacitive touch screen 505 is different, it is preferable that the contact area of the touch unit 300 be calculated as an area equal to or larger than a larger area (that is, an area corresponding to smaller touch sensitivity) among areas corresponding to each touch sensitivity that can be recognized in each capacitive touch screen 505. The contact area of the touch unit 300 may be calculated as, for example, an area larger than or equal to 25 mm$^2$, an area larger than or equal to 28 mm$^2$, or an area larger than or equal to 38 mm$^2$. The contact area of the touch unit 300 is calculated based on an area corresponding to touch sensitivity of a designated device on the capacitive touch screen 505. This allows the touch unit 300 to be recognized as one valid touch point and maximizes the number of cases in which each touch unit 300 is provided in a different position in a limited area of the flat area 405.

The contact surface 315 of the touch unit 300 is manufactured to have a figure shape corresponding to the calculated contact area. For example, the contact surface 315 of the touch unit 300 may be manufactured to have a 5 mm×5 mm square shape forming a contact area of 25 mm$^2$. Alternatively, the contact surface 315 of the touch unit 300 may be manufactured to have a circular shape having a diameter of 6 mm that forms a larger contact area than 28 mm$^2$. Alternatively, the contact surface 315 of the touch unit 300 may be manufactured to have a square shape of 6 mm×6 mm that forms a contact area of 36 mm$^2$. Alternatively, the contact surface 315 of the touch unit 300 may be manufactured to have a circular shape having a diameter of 7 mm that forms a contact area larger than 38 mm$^2$.

The touch unit 300 may be manufactured to have a "T-shape" side structure in which a touch implementation unit 310 is formed in a central portion of a buried plate 305 as illustrated in FIG. 3A, or may be manufactured to have a "F-shape" in which the touch implementation unit 310 is biased to either side of the buried plate 305 as illustrated in FIG. 3B. The flat portion 400 supports the buried plate 305 of the touch unit 300, and includes an upper plate 230 that electrically connects the handle portion 205 and the touch unit 300, an intermediate plate 235 in which the buried plate 305 of the touch unit 300 is buried, and a lower plate 240 that allows the touch implementation unit 310 of the touch unit 300 to be exposed to the outside, as illustrated in FIG. 2B.

The touch unit 300 is made of a flexible (for example, a flexible, semi-flexible, or semi-rigid) conductive material in order not to generate an error in a geometrical touch position relation of touch points or to generate a minimum error within a calculated range. As illustrated in FIG. 3A or 3B, the touch unit is manufactured through a round process in which a central portion of the contact surface 315 maintains a designated figure shape and protrudes convexly along a constant curvature on an outline of the figure shape. When the touch unit 300 manufactured in such a way is touched on the capacitive touch screen 505, the central portion protruding convexly in a constant curvature out of the contact surface 315 of the touch unit 300 is touched on the capacitive touch screen 505 first. In this state, when a constant impressing force is applied to the touch unit 300, the central portion shrinks due to the impressing force. As a result, the entire contact surface 315 of the touch unit 300 forms a calculated contact area and is touched on the capacitive touch screen 505. In this way, a center point (=touch point) of the touch surface that is touched on the capacitive touch screen 505 by the touch unit 300 corresponds to the central portion of the contact surface 315 formed on the touch unit 300 or corresponds to the central portion of the contact surface 315 within at least a calculated error tolerance In order not to generate an error in a geometrical touch position relation of the touch points or to reduce a calculated error tolerance further, the touch unit 300 may be manufactured to form an empty space inside the flexible conductive material as illustrated in FIG. 3A or 3B. The empty space inside the touch unit 300 provides a space that allows the central portion, which protrudes convexly in a constant curvature, of the contact surface 315 to shrink due to the impressing force and to be contracted into the touch unit 300. Since the touch stamp 200 is touched on the capacitive touch screen 505 while the user grasps the touch stamp, the impressing force applied to the touch unit 300 through the user's hand is present in vertical and horizontal direction components of the capacitive touch screen 505. In this case, although the horizontal direction component is present in the impressing force, the empty space inside the touch unit 300 guides the contact surface 315 of the touch unit 300 to be contracted into the touch unit 300 due to the vertical direction component without being distorted in either side due to the horizontal direction component. When the contact surface 315 of the touch unit 300 is distorted in either side of the horizontal direction component due to the impressing force, as a result, a center point of a surface touched on the capacitive touch screen 505 is also shifted to a distortion direction by a distortion amount and thus an error increases. The empty space inside the touch unit 300 prevents or minimizes generation of such an error.

The flat portion 400 is manufactured to have a figure shape and a flat area that is designed to fix the N touch units 300. The same kind of touch stamp 200 refers to a stamp that includes the same flat portion 400 and the same number of touch units 300. The flat area 405 of the flat portion 400 fixes N touch units 300 in n (n≥4) calculated positions 420 and one designated position 425. The N touch units 300, including n touch units 300 fixed in the calculated position 420 and one touch unit 300 fixed in the designated position 425 on the flat area 405, form a pre-designed geometrical position relation on the flat area 405.

According to the invention, the designed geometrical position relation of the N touch units 300 is used as a touch authentication condition for authenticating the stamp touch using the touch stamp 200. Therefore, the N touch units 300 fixed in the flat portion 400 of each stamp need to have characteristics by which a different geometrical position relation is formed for each stamp. However, since the flat area of the flat portion 400 has a limited size and the N touch units 300 fixed therein have a contact area calculated in a design stage, the number of cases in which the N touch units 300 can be fixed with a different geometrical position relation in the flat area 405 is limited. According to the invention, in the course of designing positions in which the N touch units 300 are fixed in the flat portion 400, a minimum-distinction-recognition distance is set to derive the maximum number of cases in which the N touch units 300 can be fixed with a different geometrical position relation in a limited flat area.

The minimum-distinction-recognition distance includes a minimum separation distance in which touch points of two or more touch units 300 can be distinctly recognized as different touch points in a corresponding capacitive touch screen 505 when two or more touch units 300 are touched on the capacitive touch screen 505. For example, when two points that are multi-touched in the capacitive touch screen 505 are distinctly recognized such that the two points are recognized as one touch point when a distance between the two touch points is within 6 mm or are recognized as different touch points when a distance between the two touch points is 7 mm or more, it is preferable that the minimum-distinction-recognition distance include 7 mm. Meanwhile, when there are two or more capacitive touch screens 505 on which the touch stamp 200 is touched, the minimum-distinction-recognition distance may be set as a greater separation distance out of minimum separation distances in which two touch points that are multi-touched in two or more capacitive touch screens 505 can be distinctly recognized.

According to the embodiment of the invention, the minimum-distinction-recognition distance is a value having a correlation with the contact area of the touch unit 300. That is, the minimum-distinction-recognition distance may be a value obtained by experiments based on an allowable error rather than a value set in the capacitive touch screen 505. For example, the same capacitive touch screen 505 may have a different minimum-distinction-recognition distance when a contact area of the touch unit 300 has an area of 25 mm² (for example, a contact surface 315 manufactured to have a square shape of 5 mm×5 mm) or when a contact area of the touch unit 300 has an area larger than 38 mm² (for example, a contact surface 315 manufactured to have a circular shape having a diameter of 7 mm). Therefore, it is preferable that the minimum-distinction-recognition distance be set based on experimental data on the plurality of capacitive touch screens 505 with respect to the contact area of the touch unit 300. In this case, the minimum-distinction-recognition distance may be set as a distance between central portions of the contact surface 315 of the touch unit 300, or may be set as a distance between outlines of figures forming the contact surface 315 of the touch unit 300.

According to the embodiment of the invention, when the touch stamp 200 is required to be manufactured in a number more than the maximum number of cases in which the geometrical position relation can be calculated, it is difficult to maintain uniqueness of the stamp touch using the touch stamp 200 only with the geometrical position relation. In order to address this problem, in addition to the geometrical position relation of the N touch units 300, a sound signal transmitted through a chip or a speaker (or a buzzer) provided in the touch stamp 200, a radio frequency signal transmitted through a near field communication (NFC) chip and an antenna provided in the touch stamp 200, or the like may be additionally used to maintain the uniqueness of the touch stamp 200. The sound signal may be recognized through a microphone of the wireless terminal 500 including the capacitive touch screen 505 on which the touch stamp 200 is touched. When an NFC module 511 is provided in the wireless terminal 500, it is possible to recognize the radio frequency signal of the NFC chip provided in the touch stamp 200. In this case, it is possible to maintain the uniqueness of the touch stamp 200 due to a combination of the sound signal and the geometrical position relation formed by the N touch units 300 or a combination of the geometrical position relation and the radio frequency signal of the NFC chip. The sound signal may include a unique code stored in the chip or a single-use code dynamically generated through a designated algorithm in the chip as a dual tone multi-frequency (DTMF) signal or a sound code format. The radio frequency signal of the NFC chip may include the unique code stored in the NFC chip or the single-use code dynamically generated through the designated algorithm in the NFC chip according to NFC specifications.

According to the invention, a different geometrical position relation of the N touch units 300 provided in the same kind of touch stamp 200 needs to have identification that can be identified as a different geometrical position relation when the N touch units are touched on the capacitive touch screen 505. A touch on the capacitive touch screen 505 is not a point touch but a surface touch. An operating system of the wireless terminal 500 including the capacitive touch screen 505 calculates a center point of the touch surface as a touch point and calculates the center point as being moved when the touch surface moves more than a designated distance. Therefore, in the course of designing positions in which the N touch units 300 are fixed in the flat portion 400, the minimum distinction distance is set such that the different geometrical position relation of the N touch units 300 is identified as a different geometrical position relation while the N touch units 300 are touched on the capacitive touch screen 505.

The minimum distinction distance includes a distance in which the N touch units 300 provided in a different flat portion 400 are separated to be identified as a different geometrical position relation while the N touch units 300 that are designed in a different geometrical position relation and are fixed in the flat portion 400 are touched on the capacitive touch screen 505. For example, the center point is detected to have moved when the capacitive touch screen 505 moves more than 3 mm on the touch surface of the same area, and thus the minimum distinction distance may be set as a value that is equal to or larger than 3 mm.

According to the embodiment of the invention, the minimum distinction distance may be a value obtained by experiments based on an allowable error rather than a value set in the capacitive touch screen 505. Meanwhile, when there are two or more capacitive touch screens 505 on which the touch stamp 200 is touched, the minimum distinction distance may be set as a greater separation distance out of minimum separation distances in which movement of the center point of the touch surface can be recognized in the two or more capacitive touch screens 505.

According to the invention, it is necessary to maintain readability by which the touch unit can be read when the N touch units 300 provided in the touch stamp 200 are touched on the capacitive touch screen 505 in any direction. This readability can be secured by a rule in which any touch unit 300 among the N touch units 300 is set as a reference point when the N touch units 300 are touched on the capacitive touch screen 505 in any direction.

According to the embodiment of the invention, in the course of designing positions in which the N touch units 300 are fixed in the flat portion 400, in order to secure the readability of the N touch units 300, the flat area 405 of the flat portion 400 is divided into n (n≥4) partition areas 410 in a design stage (the partition area 410 is present in a design stage and may not be represented in the flat area 405). In the n partition areas 410, each touch unit 300 is fixed in the calculated position 420 in a design stage in order to form a geometrical position relation. One touch unit 300 serving as a reference point is fixed in a position 425 designated in a design stage in any one designated area 415 out of the n partition areas 410. That is, each touch unit 300 is fixed in (n−1) partition areas 410 among the n partition areas 410 and two touch units 300 are fixed in one designated area 415. Preferably, the designated position 425 may be a position contacted with a figure outline of the flat area 405 or a corner position of the figure outline.

When the N touch units 300 are fixed in the n partition areas 410 and are touched on the capacitive touch screen 505, the touch authentication system 600 matches the n partition areas 410 including the N touch units 300 with N touch points, checks any one designated area 415 in which two touch points are recognized among the n partition areas 410, and may determine the touch point provided in the designated position 425 on the checked designated area 415 as a reference point of the N touch points. By performing coordinate rotation based on the checked reference point, it is possible to compare a rotation result with a pre-registered geometrical position relation of a touch authentication condition even when the N touch units 300 are touched on the capacitive touch screen 505 in any direction.

According to the embodiment of the invention, the touch stamp 200 may further include a housing portion 225 that protects the touch unit 300 and the flat portion 400. The housing portion 225 may include a guide portion 220 that guides the adapter portion 215 and/or the flat portion 400 in a vertical direction while the touch stamp 200 is standing as illustrated in FIG. 2A, and a spring portion 210 that keeps the touch unit 300 fixed in the flat portion 400 to float at a certain height or more from the floor. Depending on embodiments, the guide portion 220 and the spring portion 210 may not be provided. In this case, the N touch units 300 fixed in the flat portion 400 may be exposed outside the housing portion 225.

FIGS. 3A and 3B are diagrams illustrating a side structure of the exemplary touch unit 300 fixed in the flat portion 400 of the touch stamp 200.

FIG. 3A illustrates the touch unit 300 manufactured to have a "T" shape in which the touch implementation unit 310 is formed in a central portion of the buried plate 305. FIG. 3B illustrates the touch unit 300 manufactured to have "F" shape in which the touch implementation unit 310 is biased to either side of the buried plate 305. The buried plate 305 of the touch unit 300 is buried in the intermediate plate 235 illustrated in FIG. 2 and is supported by the upper plate 230. The touch implementation unit 310 of the touch unit 300 is exposed to the outside through a groove of the lower plate 240 illustrated in FIG. 4C. The buried plate 305 is formed to have the same thickness as the intermediate plate 235. The touch implementation unit 310 is formed to have a height greater than a thickness of the lower plate 240, and thus the contact surface 315 of the touch unit 300 is exposed to the outside.

A round process is performed on the contact surface 315 of the touch unit 300 such that a central portion of a corresponding contact surface 315 maintains a figure shape of the contact surface 315 and protrudes convexly along a constant curvature on an outline of the figure.

An empty space is formed inside the touch unit 300 and thus allows the round-processed contact surface to be contracted inside the touch unit 300 due to the impressing force applied by the user's hand. When the impressing force is applied to the touch stamp 200 touched on the capacitive touch screen 505 by the user's hand, the contact surface 315 is contracted into the touch unit 300 through the empty space. Therefore, the touch point does not move and is accurately touched on a designed position.

FIGS. 4A to 4D are diagrams illustrating the exemplary flat area 405 of the flat portion 400 of the touch stamp 200.

FIG. 4A illustrates a state in which the flat area 405 of the flat portion 400 is not divided in a design stage. FIG. 4B illustrates a state in which the flat area 405 of the flat portion 400 is divided into four partition areas 410. FIG. 4C illustrates the calculated position 420 and the designated position 425 in order to fix the five touch units 300 in the four partition areas 410. FIG. 4D illustrates a state in which the five touch units 300 are fixed in the calculated position 420 and the designated position 425 on the partition area 410.

The physical flat portion 400 in FIG. 4A is divided into four partition areas 410 in FIG. 4B in the course of designing positions in which the touch units 300 are fixed. As illustrated in FIG. 4B, a certain margin may be present between the partition areas 410. It is preferable that the margin include a gap of the minimum-distinction-recognition distance. In this case, when the touch unit 300 is provided in any position in each partition area 410, the touch units 300 fixed in each of the partition areas 410 may remain separated by the minimum-distinction-recognition distance or more. Meanwhile, as illustrated in FIG. 4B, when a margin is fixed between the partition areas 410, the flat area used for calculating a position in which the touch unit 300 is fixed is reduced by the margin. In order to prevent this problem, the margin illustrated in FIG. 4B is not provided and the partition area 410 is divided. Then, when a position in which the touch unit 300 is fixed is calculated, it is possible to calculate each of the touch units 300 to be separated by the minimum-distinction-recognition distance or more.

As illustrated in FIG. 4C, each position in which each touch unit 300 is fixed is calculated in each partition area 410 and a position in which one touch unit 300 is further fixed is designated in any one partition area 410. Hereinafter, for convenience of description, the touch unit 300 fixed in the designated position 425 of the designated area 415 among the n partition areas 410 is referred to as a designated touch unit 300.

As illustrated in FIG. 4D, each touch unit 300 is fixed in the calculated position 420 in each partition area 410, one designated touch unit 300 is fixed in the designated position 425 on the designated area 415, and thus the flat portion 400 having the N touch units 300 fixed therein is manufactured.

FIG. 5 is a diagram illustrating a configuration of the wireless terminal 500 and application functions provided in the wireless terminal 500 according to the first embodiment of the invention.

According to the first embodiment of the invention, when the user's wireless terminal 500 having the capacitive touch screen 505 recognizes a stamp touch using the touch stamp 200 having the N touch units 300 and transmits the stamp touch to the designated operation server 100, the operation server 100 authenticates the stamp touch using a touch authentication condition of the pre-registered touch stamp 200 and transmits the result to the wireless terminal 500. According to the first embodiment of the invention, a stamp touch using the touch stamp 200 having the N touch units 300 is recognized and is transmitted to the designated operation server 100, and the wireless terminal 500 is provided with an application including a program code for receiving a touch authentication result of the stamp touch from the operation server 100.

As illustrated in FIG. 5, the wireless terminal 500 includes a control unit 501, a memory unit 514, a key input unit 502, a screen output unit 503, a touch input unit 504, a sound output unit 506, a sound input unit 507, a short-distance wireless communication module 509, a wireless network communication module 510, an NFC module 511, a position determination module 512, a USIM reader 513, and a battery 508 for supplying power. A USIM for wireless communication of the wireless terminal 500 is attached in or detached from the USIM reader 513. The wireless terminal 500 may include at least one mobile device, for example, a smart phone, a cellular phone, or a tablet PC, which includes the capacitive touch screen 505.

The control unit 501 performs control of operations of the wireless terminal 500. The control unit 501 includes at least one processor and an execution memory as hardware and is connected to each component of the wireless terminal 500 through a bus. The control unit 501 loads and operates a program code of the memory unit 514 of the wireless terminal 500 into the execution memory through the processor as software, delivers the result to each component through the bus, controls operations of the wireless terminal 500, and may receive data necessary for calculation from each component, as necessary.

The memory unit 514 is a non-volatile memory included in the wireless terminal 500, and stores and maintains at least one program code executed through the control unit 501 and at least one data set used by the program code. The memory unit 514 stores an application implemented as a program code. When the application is driven or activated, it is loaded into and operated in the control unit 501.

The key input unit 502 includes at least one component of a key button, a keypad, or a keyboard, which is provided in the wireless terminal 500. The key input unit 502 may generate a key event that drives or activates the application. Alternatively, the key input unit 502 may generate a key event that activates the capacitive touch screen 505 to allow a stamp touch.

The screen output unit 503 includes a display (for example, a liquid crystal display (LCD)) included in the wireless terminal 500 and a driving module that drives the display in the wireless terminal 500. The screen output unit 503 outputs an execution screen of the application or a touch authentication result.

The touch input unit 504 includes a capacitive touch panel that shares a coordinate plane with the screen output unit 503 and is made of a transparent material, and a driving module that drives the capacitive touch panel in the wireless terminal 500. The capacitive touch screen 505 is implemented by combining the capacitive touch panel made of a transparent material and the display of the screen output unit 503.

The sound output unit 506 includes a speaker included in the wireless terminal 500 and a driving module that drives the speaker in the wireless terminal 500. The sound input unit 507 includes a microphone included in the wireless terminal 500 and a driving module that drives the microphone in the wireless terminal 500. When the touch stamp 200 has a function of outputting a sound signal, the sound input unit 507 receives the sound signal and delivers data encoded in the sound signal to the application.

The wireless network communication module 510 and the short-distance wireless communication module 509 are communication resources included in the wireless terminal 500. The wireless network communication module 510 connects to a wireless communication network through a base station. The short-distance wireless communication module 509 connects to a communication network through a near field communication device located within a short distance or a wireless access point (AP).

The NFC module 511 transmits and receives a radio frequency signal within a short distance of about 10 cm according to NFC specifications that use a frequency range of 13.56 MHz among wireless communication specifications of ISO 18000 series specification. When an NFC chip is provided in the touch stamp 200, the NFC module 511 may receive a radio frequency signal transmitted through the NFC chip of the touch stamp 200 and deliver data encoded in the NFC-based radio frequency signal to the application.

The position determination module 512 includes a GPS module that determines a movement position of the wireless terminal 500. According to the first embodiment of the invention, the position determination module 512 may deliver position information of the wireless terminal 500 determined when the touch stamp 200 having N touch units 300 is touched on the capacitive touch screen 505 to the application.

According to the invention, the application is downloaded to the wireless terminal 500 through a designated program providing server (for example, Apple App Store) and is installed in the wireless terminal 500 (this process will be omitted when a manufacturer of the wireless terminal 500 installs the application by default). The application is driven or activated manually by the user or is driven or activated when a push notification is received. Hereinafter, for convenience of description, features of the invention will be described by illustrating a function component of the application in the control unit 501 that is implemented as a program code in the application, loaded into and operated in the control unit 501, and is functionalized.

As illustrated in FIG. 5, the application functionally includes a stamp touch recognition unit that recognizes N touch points touched on the capacitive touch screen 505 using the touch stamp 200 having N (N≥5) touch units 300 made of a rubber-elastic conductive material.

The stamp touch recognition unit reads a touch event generated through the operating system one or more times and recognizes N touch points that are touched on the capacitive touch screen 505 by the N touch units 300 included in the touch stamp 200. Typically, the touch event generated through the operating system does not distinguish a multi-touch by the user's fingers and a touch stamp 200 touch by the touch stamp 200. However, the touch stamp 200 of the invention includes N touch units 300 according to a pre-designed pattern and thus has a touch characteristic according to a pre-designed rule. Based on this characteristic, it is possible to distinguish the multi-touch by the user's fingers and recognize the touch stamp 200 touch by the touch stamp 200.

In order to clearly determine the touch stamp 200 touch according to the designed rule, the stamp touch recognition unit may selectively additionally apply at least one condition among a simultaneous touch condition, a fixed touch condition, a static touch condition, and a dynamic touch condition, or may additionally apply a combination of two or more conditions.

For the simultaneous touch condition, it is determined whether N touch units 300 included in the touch stamp 200 are touched simultaneously on the capacitive touch screen 505. The simultaneous touch condition may be applied when N touch units 300 provided in the flat area 405 of the touch stamp 200 are designed and manufactured to have the same height (or a similar height within an allowed range) and the touch unit 300 of the touch stamp 200 manufactured in such a way is touched on the flat capacitive touch screen 505.

When the simultaneous touch condition is applied to recognize the N touch points, the stamp touch recognition unit reads the touch event and checks whether the number of touch points is N when two or more touch points are touched while the touch point is not touched through the capacitive touch screen 505. When the number of checked touch points is N, the stamp touch recognition unit may determine the N touch points as a touch point touched using the touch stamp 200 designed and manufactured to satisfy the simultaneous touch condition.

Alternatively, when the simultaneous touch condition is applied to recognize the N touch points, the stamp touch recognition unit reads the touch event and checks whether two or more touch points are recognized through the capacitive touch screen 505. When two or more touch points are recognized through the capacitive touch screen 505, the stamp touch recognition unit repeatedly recognizes the two or more touch points touched on the capacitive touch screen 505 in a designated time interval based on the touch event. The stamp touch recognition unit checks whether the number of touch points that are touched within a designated certain time from when the two or more touch points are initially recognized is N. When the number of touch points that are checked within the certain time is N, the stamp touch recognition unit may determine the N touch points as touch points touched using the touch stamp 200 designed and manufactured to satisfy the simultaneous touch condition.

For the fixed touch condition, it is determined whether the touch stamp 200 is touched on the capacitive touch screen 505 based on the user's behavior habit of stamping the touch stamp 200. Typically, when the user stamps his or her seal on the paper, the user who has experience with stamping has a behavior habit of keeping the stamp in contact with the paper for a certain time until a stamping ink is sufficiently affixed to the paper. Such a behavior habit may be expressed naturally when the touch stamp 200 is touched on the capacitive touch screen 505 without the stamping ink.

When the fixed touch condition is applied to recognize the N touch points, the stamp touch recognition unit reads the touch event and checks whether the N touch points are recognized through the capacitive touch screen 505. When the N touch points are recognized through the capacitive touch screen 505, the stamp touch recognition unit repeatedly recognizes the N touch points touched on the capacitive touch screen 505 in a designated time interval based on the touch event. The stamp touch recognition unit checks whether the number of touch points that are repeatedly recognized for a certain time is N. When the number of touch points that are repeatedly recognized for a certain time is N, the stamp touch recognition unit may determine the N touch points as a touch point that is touched by a behavior habit of stamping the touch stamp 200.

Alternatively, when the fixed touch condition is applied to recognize the N touch points, the stamp touch recognition unit reads the touch event and checks whether the N touch points are recognized through the capacitive touch screen 505. When the N touch points are recognized through the capacitive touch screen 505, the stamp touch recognition unit repeatedly recognizes the N touch points touched on the capacitive touch screen 505 in a designated time interval based on the touch event. The stamp touch recognition unit repeatedly checks positions of the repeatedly recognized N touch points, compares the positions of the repeatedly checked N touch points for each touch point, and checks whether the positions of the N touch points are changed. When the positions of the N touch points are not changed, the stamp touch recognition unit may determine the N touch points as touch points touched by a behavior habit of stamping the touch stamp 200.

For the static touch condition, it is determined whether the N touch units 300 included in the touch stamp 200 maintain a static state without moving while touching the capacitive touch screen 505. The static touch condition may be applied when the N touch units 300 included in the touch stamp 200 are designed and manufactured not to move.

When the static touch condition is applied to recognize the N touch points, the stamp touch recognition unit reads the touch event and checks whether the N touch points are recognized through the capacitive touch screen 505. When the N touch points are recognized through the capacitive touch screen 505, the stamp touch recognition unit repeatedly recognizes the N touch points touched on the capacitive touch screen 505 in a designated time interval based on the touch event. The stamp touch recognition unit repeatedly checks a position relation of the repeatedly recognized N touch points, compares a position relation of the repeatedly checked N touch points, and checks whether a position relation of the N touch points maintains a static state without change. When the position relation of the N touch points maintains a static state, the stamp touch recognition unit may determine the N touch points as touch points that have touched the N touch units 300 fixedly mounted in the touch stamp 200.

For the dynamic touch condition, it is determined whether the N touch units 300 included in the touch stamp 200 move based on a designated rule of the capacitive touch screen 505 or the N touch units 300 are sequentially touched based on the designated rule of the capacitive touch screen 505. The dynamic touch condition may be applied when the N touch units 300 provided in the flat area 405 of the touch stamp 200 are designed and manufactured to move according to a stamping power of the touch stamp 200, or when at least one touch unit 300 among the N touch units 300 provided in the flat area 405 of the touch stamp 200 is set to have a different height and thus the N touch units 300 are designed and manufactured to be sequentially touched on the capacitive touch screen 505 according to the stamping power of the touch stamp 200.

When the fixed touch condition is applied to recognize the N touch points, the stamp touch recognition unit reads the touch event and checks whether the N touch points are recognized through the capacitive touch screen 505. When the N touch points are recognized through the capacitive touch screen 505, the stamp touch recognition unit repeatedly recognizes the N touch points touched on the capacitive touch screen 505 in a designated time interval based on the touch event. The stamp touch recognition unit repeatedly checks positions of the repeatedly recognized N touch points, compares positions of the repeatedly checked N touch points, and checks whether a position relation of the N touch points has a dynamic state that is changed based on the designated rule. When the position relation of the N touch points has the dynamic state that is changed by the designated rule, the stamp touch recognition unit may determine the N touch points as touch points touched using the touch stamp 200 including N touch units 300 that are designed and manufactured to move according to the designated rule.

Alternatively, when the fixed touch condition is applied to recognize the N touch points, the stamp touch recognition unit reads the touch event, repeatedly recognizes a touch point touched on the capacitive touch screen 505 in a designated time interval from when at least one touch point is recognized through the capacitive touch screen 505, and repeatedly checks the number of touch points and a position of the touch point while the touch point is repeatedly recognized. The stamp touch recognition unit checks a change of the number of touch points while the touch point is repeatedly recognized and repeatedly checks a position of the touch point according to the change of the number of touch points. Since the number of touch points is changed by the user's pressing power of the touch stamp 200, the number of touch points increases up to N and should not be decreased in the course. In addition, a position of a touch point that is additionally checked as the number of touch points increases should be fixed without change. The stamp touch recognition unit checks the change of the number of repeatedly checked touch points, checks whether the position of the touch point has the above characteristic, and thus checks whether the N touch points are sequentially touched based on the designated rule. When the N touch points are sequentially touched based on the designated rule, the stamp touch recognition unit may determine the N touch points as touch points that are touched using the touch stamp 200 having the N touch units 300 designed and manufactured to be sequentially touched based on the designated rule.

As illustrated in FIG. 5, the application functionally includes a stamp touch reading unit that reads a component value of the N touch points touched using the touch stamp 200 having the N touch units 300.

When the N touch points touched on the capacitive touch screen 505 using the touch stamp 200 are recognized, the stamp touch reading unit extracts the component value of the N touch points in order to check a geometrical position relation formed by the N touch points. The component value of N touch points may include at least one of a coordinate value on a designated coordinate system, a scalar value, and a vector value, or a combination of two or more values thereof. The coordinate system for extracting the component value may include a rectangular coordinate system applied to the capacitive touch screen 505. Meanwhile, the designated coordinate system may include another coordinate system defined for analyzing the position relation of the N touch points in addition to the coordinate system applied to the capacitive touch screen 505. For example, the component value may include a coordinate value on the designated coordinate system such as A(51, y1), B(52, y2), C(53, y3), D(54, y4), and E(55, y5). The component value may include a segment value calculated based on the coordinate value on the coordinate system such as a segment AB, a segment AC, a segment AD, and a segment AE, and a scalar value including at least one angle value such as ∠BAC, ∠BAD, ∠BAE, ∠CAD, ∠CAE, and ∠DAE. The component value may include a vector value calculated based on a reference point or a reference line on the coordinate system. The reference point for calculating the vector value may be an origin point on the coordinate system or any one point of the N touch points.

As illustrated in FIG. 5, the application functionally includes a position checking unit configured to check position information of the wireless terminal 500, an information transmitting unit configured to transmit the component value of N touch points touched on the capacitive touch screen 505 to the designated operation server 100 through a designated path, and an authentication result receiving unit configured to receive a touch authentication result transmitted from the operation server 100 through a designated path.

When the component value of the N touch points is read through the stamp touch reading unit, the information transmitting unit composes touch recognition information that allows the read component value to be delivered to the operation server 100. According to the embodiment of the invention, the information transmitting unit checks unique information that uniquely identifies the wireless terminal 500 from the memory unit 514, and may compose touch recognition information including the checked unique information and the read component value.

When the application includes a position checking function, the position checking unit checks position information of the wireless terminal 500 determined at any time point before, while, and after the N touch points are touched on the capacitive touch screen 505 using the position determination module 512. In this case, the information transmitting unit may add the checked position information to the touch recognition information.

As illustrated in FIG. 5, when the touch stamp 200 includes a sound signal output function, the application may further functionally include a sound recognition unit configured to recognize a single-use code or a unique code encoded in the sound signal.

The touch stamp 200 may include a chip or a speaker that outputs a sound signal in which the unique code or the single-use code is encoded. The sound input unit 507 receives a sound signal output from the speaker of the touch stamp 200 when the N touch units 300 included in the touch stamp 200 are touched on the capacitive touch screen 505. The sound recognition unit reads a sound signal input through the sound input unit 507 and extracts the unique code or the single-use code encoded in the sound signal. In this case, the information transmitting unit may add the checked unique code or single-use code to the touch recognition information.

As illustrated in FIG. 5, when the touch stamp 200 includes the NFC chip, the application may further functionally include the sound recognition unit configured to recognize the unique code or the single-use code encoded in the radio frequency signal transmitted through the NFC chip.

The touch stamp 200 may include the NFC chip and an antenna that are used to transmit an NFC-based radio frequency signal in which the unique code or the single-use code is encoded. When the touch stamp 200 is close to a designated range or the N touch units 300 included in the touch stamp 200 are touched on the capacitive touch screen 505, the NFC module 511 receives the NFC-based radio frequency signal transmitted through the NFC chip of the touch stamp 200. The NFC recognition unit reads the NFC-based radio frequency signal received through the NFC module 511 and extracts the unique code or the single-use code encoded in the radio frequency signal. In this case, the information transmitting unit may add the checked unique code or single-use code to the touch recognition information.

The information transmitting unit transmits the composed touch recognition information to the designated relay server 105 using the communication resources. The relay server 105 relays and transmits the touch recognition information to the operation server 100. Alternatively, the information transmitting unit may directly transmit the composed touch recognition information to the designated operation server 100 using the communication resources.

The operation server 100 authenticates the touch recognition information, and generates and transmits the touch authentication result. The authentication result receiving unit receives the touch authentication result through the communication resources. Meanwhile, the touch authentication result may include information on a service that is provided when the touch stamp 200 is touched on the capacitive touch screen 505. When the touch authentication result includes service information or service information linked with the touch authentication result is received, the application functionally includes a service procedure performing unit configured to perform procedures for providing a designated service (for example, a value accumulation service and a value usage service) using the service information.

FIG. 6 is a diagram illustrating a configuration of the touch authentication system 600 according to the first embodiment of the invention.

According to the first embodiment of the invention, the operation server 100 authenticates N touch points touched on the capacitive touch screen 505 of the wireless terminal 500. FIG. 6 is a diagram illustrating a functional configuration of the touch authentication system 600 that is implemented as software in the operation server 100.

As illustrated in FIG. 6, the touch authentication system 600 includes an authentication condition storage 605 configured to store a touch authentication condition including a designed geometrical position relation of N touch units 300 included in the touch stamp 200.

The authentication condition storage 605 checks a designed geometrical position relation corresponding to a distance relation and an angle relation between a designated touch point corresponding to a center point of one designated touch unit 300 provided in the flat portion 400 of the touch stamp 200 and the N touch points corresponding to a center point of the n touch units 300 provided in the flat portion 400 of the touch stamp 200, and stores the touch authentication condition which includes the designed geometrical position relation between the designated touch point and the n touch points and partition area information of the n partition areas 410. The touch authentication condition includes the minimum-distinction-recognition distance of the touch stamp 200 and/or an authentication condition of a minimum distinction distance. When the touch stamp 200 includes the sound signal output function or the NFC chip, the touch authentication condition may include an authentication condition of authenticating the unique code or the single-use code encoded in the sound signal or the NFC-based radio frequency signal.

According to the embodiment of the invention, the designed geometrical position relation includes a coordinate relation that includes a coordinate value of a designated touch point determined as a coordinate value type on a pre-set designated coordinate system when the flat portion 400 including the N touch units 300 is designed or manufactured and a relative coordinate value of the n touch points, and/or a distance relation between a designated touch point and each of the n touch points with respect to a coordinate value on the designated coordinate system, and an angle relation formed by n touch points with respect to a designated touch point on the designated coordinate system. Here, the designated coordinate system is a coordinate system that serves as a reference for analyzing the geometrical position relation between the designated touch point and the n touch points, and preferably includes a practically used unit of measure (for example, μm, mm, and cm) or a coordinate system composed of a designated logical unit. However, depending on embodiments, it is possible to include a touch screen coordinate system of the wireless terminal 500.

While the flat portion 400 including the N touch units 300 is designed and manufactured, the authentication condition storage 605 checks the geometrical position relation corresponding to the designed calculated position 420 and the designed position 425 in order to provide the N touch units 300 in the flat portion 400, or receives the geometrical position relation from a designated terminal, and may store the touch authentication condition including the designed geometrical position relation in a designated storage medium 610.

According to the embodiment of the invention, the authentication condition storage 605 checks designed error information corresponding to a designed allowed error tolerance of the designed geometrical position relation and may store the touch authentication condition including the designed geometrical position relation and the designed error information in the designated storage medium 610. When a measured position relation is not checked, the touch authentication condition may be used for authentication.

According to the embodiment of the invention, the authentication condition storage 605 checks a serial code assigned to the flat portion 400 including the N touch units 300, maps the touch authentication condition and the serial code, and may store the result in the designated storage medium 610.

The authentication condition storage 605 checks a component value of N touch points that are repeatedly touched more than a designated number of times on a capacitive touch panel, which is provided in a device designated to register a geometrical position relation of the touch unit 300 of the touch stamp 200, matches and compares the repeatedly touched component value and the designed geometrical position relation, and determines whether the N touch points are touched within a designated allowed error tolerance (for example, within a 95% confidence interval in a Gaussian distribution). When the repeatedly touched component value matches or is close to the designed geometrical position relation within the designated allowed error tolerance, the authentication condition storage 605 calculates measured error information based on the repeatedly touched component value, generates a geometrical position relation including the designed geometrical position relation and the calculated measured error information, and then may store a touch authentication condition including the generated geometrical position relation. Meanwhile, when the repeatedly touched component value and the designed geometrical position relation are within the designated allowed error tolerance, the measured error is included in a designed error. Thus, the authentication condition storage 605 may store a touch authentication condition that includes the designed geometrical position relation and the designed error information to be used for authentication.

According to the embodiment of the invention, the authentication condition storage 605 receives a serial code assigned to the flat portion 400 of the touch stamp 200 to be registered from a device designated for registration and checks a designed geometrical position relation in which error information is calculated using the received serial code. The authentication condition storage 605 checks a component value that is repeatedly touched more than a designated number of times on the capacitive touch panel of the device for registration through a touch point checking unit 620 to be described below, checks whether a mutual position relation of each of the checked touch points is valid in conjunction with a touch point authenticating unit 630 to be described below, checks a measured position relation of the repeatedly touched N touch points in conjunction with a touch point identification unit 635 and a position relation calculating unit 640 to be described below, compares a distance relation and an angle relation which are included in the measured position relation and a distance relation and an angle relation which are included in the designed geometrical position relation corresponding to the touch authentication condition checked through the serial code, and checks whether the measured position relation is within the designated allowed error tolerance with respect to the designed geometrical position relation. When the measured position relation is outside of the designated allowed error tolerance, it is preferable that error correction be performed on the flat portion 400 of the manufactured touch stamp 200 to be included within the designated allowed error tolerance or decomposition and re-manufacturing be performed. To this end, the authentication condition storage 605 may output information necessary for error correction or re-manufacturing of the flat portion 400 of the manufactured touch stamp 200 and instruct accompanying tasks. Meanwhile, when the component value that is repeatedly touched on the capacitive touch screen 505 of the device for registration is within the designated allowed error tolerance, the authentication condition storage 605 checks error information (for example, measured error information or designed error information) based on the repeatedly touched component value, generates a geometrical position relation including the designed geometrical position relation and the checked error information, and then may store a touch authentication condition including the generated geometrical position relation.

The authentication condition storage 605 may map the touch authentication condition including the generated geometrical position relation for each touch stamp 200 and the serial code for each touch stamp 200, and store the result in the designated storage medium 610. Meanwhile, the manufactured touch stamp 200 is supplied to a stamp-using client (for example, a franchise which provides a designated service using the touch stamp 200) in a specific position (or a region), and the authentication condition storage 605 receives the serial code of the touch stamp 200 and position information (for example, address information, and local information) of the client from the terminal device 110 provided in the client and checks the touch authentication condition corresponding to the touch stamp 200 provided to the client based on the serial code. When the touch authentication condition mapped to the serial code is not checked, the authentication condition storage 605 transmits a non-registration error of the touch stamp 200 corresponding to the authentication code to the terminal device 110 of the client. On the other hand, when the touch authentication condition mapped to the serial code is checked, the authentication condition storage 605 may map the checked touch authentication condition and the position information of the client, and store the result in the storage medium 610.

As illustrated in FIG. 6, the touch authentication system 600 includes an information receiving unit 615 configured to receive touch recognition information including a component value of N touch points touched on the capacitive touch screen 505 of the wireless terminal 500, a touch point checking unit 620 configured to check a component value corresponding to the component value included in the touch recognition information, and a position information checking unit 625 configured to check position information of the wireless terminal 500 using the touch recognition information.

The information receiving unit 615 receives touch recognition information transmitted from the application of the wireless terminal 500. The touch recognition information includes the component value of the N touch points touched on the capacitive touch screen 505 of the wireless terminal 500, and may further include unique information and/or position information of the wireless terminal 500 depending on embodiments. The touch recognition information may further include a sound signal output from the touch stamp 200, or the unique code or the single-use included in the NFC-based radio frequency signal.

The touch point checking unit 620 checks the component value of the N touch points included in the touch recognition information. When the component value includes a coordinate value of the touch screen coordinate system, the touch point checking unit 620 may perform coordinate transformation of the component value into a coordinate system corresponding to the geometrical position relation included in the touch authentication condition. Meanwhile, the coordinate transformation may be performed by a touch point authenticating unit 630, a touch point identification unit 635, or a position relation calculating unit 640, which are to be described below.

The position information checking unit 625 checks position information of the wireless terminal 500 for the N touch points included in the touch recognition information. When the touch recognition information does not include the position information of the wireless terminal 500, the position information checking unit 625 may check cell-based position information corresponding to a position calculated using a base station or a wireless AP that has a wireless link with the wireless terminal 500.

As illustrated in FIG. 6, the touch authentication system 600 includes the touch point authenticating unit 630 configured to read a mutual position relation between N touch points using the component value included in the touch recognition information and authenticate whether the read mutual position relation includes a position relation that can be formed when the touch unit 300 of the designed and manufactured touch stamp 200 is touched on the capacitive touch screen.

The touch point authenticating unit 630 reads the checked component value through the touch point checking unit 620 and authenticates whether the N touch points are touch points that are touched using the N touch units 300 provided in the flat portion 400 of the valid touch stamp 200.

According to the embodiment of the invention, the touch point authenticating unit 630 calculates a distance between the n touch points or a distance between N touch points, determines whether the calculated distance between the touch points is greater than or equal to the minimum-distinction-recognition distance set for the valid touch stamp 200, and thus may authenticate whether the N touch points are touch points of the valid touch stamp 200 designed and manufactured using a design method according to the invention. Distance comparison is performed based on a coordinate distance on the same coordinate system and coordinate transformation may be performed for comparison. When any one distance between the touch points is less than the set minimum-distinction-recognition distance within the designated allowed error tolerance, it is possible to determine that the N touch points are not touch point of the valid touch stamp 200.

According to the embodiment of the invention, the touch point authenticating unit 630 sets and maintains an N-gon structure condition that is formed by segments connecting the N touch points. Here, the N-gon structure condition includes at least one condition for reading a geometric characteristic kept by the N-gon in which one touch unit 300 having a designated contact area is provided in (n−1) partition areas 410 and two touch units 300 having a designated touch unit 300 are provided in any one designated area 415 out of the n partition areas 410 obtained by dividing the flat area 405 of the flat portion 400 of the valid touch stamp 200. For example, the N-gon structure condition may include a contact area size of the touch unit 300, a minimum-distinction-recognition distance, and a minimum distinction distance, a method of dividing the flat area 405, a geometric characteristic condition of the N-gon that can be formed based on a margin area not used in the flat area 405 or the like, and/or a geometric characteristic condition that may not be formed. When the N-gon structure condition is set, the touch point authenticating unit 630 forms the N-gon by connecting the N touch points and reads the formed geometric characteristic of the N-gon using the set N-gon structure condition. Therefore, it is possible to authenticate whether the N touch points are touch points of the valid touch stamp 200 designed and manufactured through the design method according to the invention.

When coordinate transformation of the component value into the designated coordinate system is performed, it is preferable that the touch point authenticating unit 630 use a value set as information on the designated coordinate system and read a mutual position relation between N touch points. When coordinate transformation of the component value into the designated coordinate system is not performed, the touch point authenticating unit 630 may perform coordinate transformation of the component value into the designated coordinate system and then read the mutual position relation.

As illustrated in FIG. 6, the touch authentication system 600 includes a touch point identification unit 635 configured to read the component value using the partition area information of the n partition areas 410 and identify the designated touch point provided in the designated position 425 of the designated area 415, a position relation calculating unit 640 configured to calculate an authentication target geometrical position relation between the identified designated touch point and each of the n touch points, and a touch authentication processing unit 645 configured to compare the authentication target geometrical position relation between the calculated designated touch point and each of the n touch points and the geometrical position relation of the touch authentication condition for authentication.

The touch point identification unit 635 matches the component value checked through the touch point checking unit 620 or the component value authenticated through the touch point authenticating unit 630 and the partition area information of the n partition areas 410. When the partition area information is set as coordinate area information of the designated coordinate system, the touch point identification unit 635 matches the component value of which coordinate transformation is performed into the designated coordinate system and the partition area information. Coordinate transformation of the component value into the designated coordinate system is performed through the touch point checking unit 620 or the touch point authenticating unit 630, or coordinate transformation into the designated coordinate system may be performed by the touch point identification unit 635.

According to a first designated touch point identification method, in order to match the partition area information and the component value, the touch point identification unit 635 determines any one point of the N touch points as a virtual designated touch point, matches the virtual designated touch point and the partition area information, and then performs at least one coordinate rotation of n touch points with respect to the virtual designated touch point. Therefore, it is possible to check that two touch points are present in the designated area 415 in which the virtual designated touch point is positioned out of the n partition areas 410 and each touch point is in the remaining (n–1) partition areas 410. When the two touch points are present in the designated area 415 in which the virtual designated touch point is positioned and each touch point is present in the remaining (n–1) partition areas 410, the virtual designated touch point may be determined as the designated touch point provided in the designated position designed according to the invention.

According to the embodiment of the invention, in order to reduce the process of matching the partition area information and the component value, the touch point identification unit 635 may predict a touch point having a high probability of being the designated touch point out of the N touch points based on the N-gon geometric characteristic formed by the N touch points, determine the predicted touch point first as the virtual designated touch point, and perform the matching process. For example, when there is a vertex having an internal angle of greater than 180° out of internal angles of the N-gon vertexes, the touch point identification unit 635 may predict touch points in both sides of a corresponding vertex as the virtual designated touch point.

According to a second designated touch point identification method, the touch point identification unit 635 matches a designed virtual origin point and the partition area information, matches any one point out of the N touch points to the designated touch point position based on the virtual origin point, and then performs at least one coordinate rotation of the N touch points with respect to the virtual origin point. Therefore, it is possible to check that two touch points are present in the designated area 415 out of the n partition areas 410 and each touch point is present in the remaining (n–1) partition areas 410. When the two touch points are present in the designated area 415 and each touch point is present in the remaining (n–1) partition areas 410, it is possible to identify the virtual designated touch point as the designated touch point provided in the designated position designed according to the invention.

When the designated touch point out of the N touch points is identified, the position relation calculating unit 640 calculates the authentication target geometrical position relation between the designated touch point and each of the n touch points, which includes a distance relation between the identified designated touch point and each of the n touch points provided in the n partition areas 410 and an angle relation formed by the n touch points with respect to the identified designated touch point.

The distance relation includes a coordinate distance in the designated coordinate system. The coordinate distance includes a relative coordinate distance calculated using a coordinate value based on the designated coordinate system, and may be represented as a vector value that further includes a specific direction in the designated coordinate system depending on embodiments.

The angle relation includes a coordinate angle on the designated coordinate system. The coordinate angle may include an angle that is formed by two touch points out of n touch points on the coordinate system using the designated touch point as a reference point, or an angle formed by segments that connect the designated touch point and each of the n touch points with respect to a specific reference line on the designated coordinate system.

According to the embodiment of the invention, it is preferable that the position relation calculating unit 640 calculate the authentication target geometrical position relation between the designated touch point and each of the n touch points based on the coordinate value on the designated coordinate system.

When the authentication target geometrical position relation between the designated touch point and each of the n touch points is calculated, the touch authentication processing unit 645 matches the geometrical position relation of the touch authentication condition stored in the authentication condition storage 605 and the authentication target geometrical position relation between the calculated designated touch point and each of the n touch points for each touch point, and then compares a distance and an angle to check whether or not they match or are close to the designated allowed error tolerance. When the calculated authentication target geometrical position relation and the geometrical position relation of the touch authentication condition match for each matched touch point or are close to the designated error tolerance, the component value checked through the touch point checking unit 620 is authenticated as a touch of the touch stamp 200 including the N touch units 300 corresponding to the matching or close touch authentication condition.

When the touch authentication condition stored in the storage medium 610 and the position information of the client of the touch stamp 200 are mapped and stored and the position information of the wireless terminal 500 is checked, the touch authentication processing unit 645 checks a comparison target touch authentication condition that is mapped to position information matching the received position information out of touch authentication conditions stored in the storage medium 610, and compares first whether the geometrical position relation of the comparison target touch authentication condition and the calculated authentication target geometrical position relation match or are close to within the designated error tolerance. Therefore, it is possible to reduce a time for comparing and authenticating the calculated authentication target geometrical position relation and the geometrical position relation of the touch authentication condition for each touch stamp 200 stored in the storage medium 610.

The touch authentication processing unit 645 generates an authentication result (for example, an authentication error result or an authentication success result) of the component value and transmits the generated touch authentication result in a direction reverse to a path from which the component value was received. The touch authentication result is output to the application of the wireless terminal 500 or is used as an authentication value for providing a designated service through the application of the wireless terminal 500.

As illustrated in FIG. 6, when the touch recognition information includes the unique code or the single-use code recognized through the sound or the NFC, the touch authentication system 600 includes a code checking unit 650 configured to check the unique code or the single-use code included in the touch recognition information and a code authenticating unit 655 configured to authenticate the unique code or the single-use code using the touch authentication condition. The touch authentication processing unit 645 generates a touch authentication result in which an authentication result of the component value and an authentication result of the unique code or the single-use code are combined, and may transmit the generated touch authentication result in a direction reverse to a path from which the component value was received. An authentication condition for authenticating the unique code includes a code value that can be compared with a unique code. An authentication condition for authenticating the single-use code may include at least one seed value and a code generation algorithm used to dynamically generate the single-use code in the NFC chip of the touch stamp 200.

FIG. 7 is a flowchart illustrating a process of registering the touch authentication condition of the touch stamp 200 in the touch authentication system 600.

In the course of designing and manufacturing the flat portion 400 of the touch stamp 200, the touch authentication system 600 checks the designed geometrical position relation of the N touch units 300 provided in the flat portion 400 (700) and stores the designed geometrical position relation of the N touch units 300 (705). The geometrical position relation may include the designed error information. When measurement verification of the designed geometrical position relation is not performed, a touch authentication condition including the designed geometrical position relation and the designed error information is generated (725). The generated touch authentication condition and the serial code of the touch stamp 200 may be mapped and stored in the storage medium 610 (730).

Meanwhile, when measurement verification of the designed geometrical position relation is performed, the touch authentication system 600 checks a measured position relation when the N touch units 300 included in the touch stamp 200 are repeatedly touched on the designated capacitive touch screen 505 more than a designated number of times (710). When the measured position relation of the N touch units 300 is checked, the touch authentication system 600 checks whether the measured position relation is within the allowed error tolerance of the designed geometrical position relation (715). When the measured position relation is not within the allowed error tolerance, the touch authentication system 600 performs a process of correcting the N touch units 300 provided in the flat portion 400 of the touch stamp 200 (720), or performs a process of re-manufacturing the flat portion 400 of the touch stamp 200 (720).

Meanwhile, when the measured position relation is within the allowed error tolerance, the touch authentication system 600 generates a touch authentication condition including the designed geometrical position relation of the flat portion 400 of the touch stamp 200 and the error information (725), maps the serial code of the touch stamp 200 and the touch authentication condition, and stores the result in the storage medium 610 (730). The touch authentication condition includes at least one of partition area information, a minimum-distinction-recognition distance, and a minimum distinction distance in common, or may be linked to authenticate, by the touch authentication system 600, N touch points touched by the touch unit 300 of the touch stamp 200.

FIG. 8 is a flowchart illustrating a process of registering and linking the touch authentication condition of the touch stamp 200 and the stamp-using client in the touch authentication system 600.

The touch authentication system 600 receives the position information of the stamp-using client and the serial code of the touch stamp 200 from the terminal device 110 of the stamp-using client provided with the touch stamp 200 (800). The touch authentication system 600 checks a touch authentication condition that is mapped to the received serial code among touch authentication conditions registered in the storage medium 610 through the process illustrated in FIG. 7 (805).

When the touch authentication condition mapped to the serial code is not checked, the touch authentication system 600 composes non-registration error information of the touch stamp 200 and transmits the information to the terminal device 110 (810). On the other hand, when the touch authentication condition mapped to the serial code is checked, the touch authentication system 600 maps the checked touch authentication condition and the received position information of the stamp-using client and stores the result in the storage medium 610 (815).

FIG. 9 is a flowchart illustrating a process of recognizing the stamp touch using the touch stamp 200 in the application of the wireless terminal 500.

When the application is driven or activated, the wireless terminal 500 (900) checks a touch event of a touch point that is touched on the capacitive touch screen 505 (905), reads the touch event and checks whether a stamp touch touching the N touch units 300 included in the touch stamp 200 is recognized (910). The stamp touch may be a touch touching N touch points on the capacitive touch screen 505 or a touch in which at least one condition of a fixed touch condition, a static touch condition, and a dynamic touch condition is further applied.

When the stamp touch is recognized, the application of the wireless terminal 500 reads a component value of N touch points corresponding to the N touch units 300 included in the touch stamp 200 (915). When the position information of the wireless terminal 500 is used for authenticating the N touch points, the application of the wireless terminal 500 checks the position information of the wireless terminal 500 (920).

The application of the wireless terminal 500 composes touch recognition information including the component value of the N touch points and the position information of the wireless terminal 500 (925) and transmits the touch recognition information through a designated path (930). When the touch stamp 200 includes the function of outputting a sound signal or the NFC chip and the unique code or the single-use code that is encoded in the radio frequency signal received from the sound signal or the NFC chip is checked at the time of touching of the touch stamp 200 on the capacitive touch screen 505, the application of the wireless terminal 500 may add the checked unique code or single-use code to the touch recognition information and transmit the information.

FIG. 10 is a flowchart illustrating a process of authenticating the stamp touch when the N touch units 300 provided in the touch stamp 200 are touched on the capacitive touch screen 505.

Through the process illustrated in FIG. 9, the touch authentication system 600 receives the touch recognition information transmitted from the application of the wireless terminal 500 through the designated path (1000) and checks the component value of N touch points included in the touch recognition information (1005).

The touch authentication system 600 reads a mutual position relation of the N touch points based on the component value and thus authenticates whether the N touch points corresponding to the component value are touch points of the touch stamp 200 that is validly designed and manufactured (1010). When the N touch points are not touch points of the valid touch stamp 200, the touch authentication system 600 generates an authentication error result of the N touch points (1040) and transmits the touch authentication result including the authentication error result through the designated path (1050).

When the N touch points are touch points of the valid touch stamp 200, the touch authentication system 600 reads the component value through partition area information of the n partition areas 410 applied in a design stage in the course of manufacturing the flat portion 400 of the touch stamp 200, and identifies the designated touch point corresponding to the touch unit 300 provided in the designated position 425 on the designated area 415 out of the n partition areas 410 (1015). When the designated touch point is not identified, the touch authentication system 600 generates an authentication error result of the N touch points (1040) and transmits the touch authentication result including the authentication error result through the designated path (1050).

When the designated touch point is identified in the N touch points, the touch authentication system 600 calculates an authentication target geometrical position relation between the identified designated touch point and each of the n touch points (1020). Meanwhile, when the touch authentication condition and the position information of the stamp-using client are mapped through the process illustrated in FIG. 8, the touch authentication system 600 checks the position information of the wireless terminal 500 based on the touch recognition information, compares the position information of the wireless terminal 500 and the position information of the touch authentication condition, checks at least one comparison target touch authentication condition to be compared with the calculated authentication target geometrical position relation out of a plurality of touch authentication conditions stored in the storage medium 610 (1025), and compares the geometrical position relation of the comparison target touch authentication condition and the calculated authentication target geometrical position relation (1030). When the touch authentication condition does not match the position information of the stamp-using client, a geometrical position relation of all touch authentication conditions stored in the storage medium 610 may be compared.

The touch authentication system 600 checks the touch authentication condition including a geometrical position relation that matches the authentication target geometrical position relation or is close to the designated allowed error tolerance (1035). When the touch authentication condition including the geometrical position relation that matches the authentication target geometrical position relation or is close to the designated allowed error tolerance is checked, the touch authentication system 600 may authenticate that the stamp touch corresponding to the authentication target geometrical position relation touches the touch stamp 200 corresponding to the checked touch authentication condition.

When the authentication target geometrical position relation is not authenticated, the touch authentication system 600 generates an authentication error result of the N touch points (1040) and transmits a touch authentication result including the authentication error result through the designated path (1050). On the other hand, when the authentication target geometrical position relation is authenticated, the touch authentication system 600 generates an authentication success result of the N touch points (1040) and transmits a touch authentication result including the authentication success result through the designated path (1050).

When the touch recognition information includes the unique code or single-use code recognized through the sound or the NFC, the touch authentication system 600 performs an authentication process of the unique code or single-use code included in the touch recognition information using the touch authentication condition, generates a touch authentication result in which an authentication result of the authentication target geometrical position relation and an authentication result of the unique code or the single-use code are combined, and then may transmit the generated touch authentication result through the designated path (1050).

FIG. 11 is a diagram illustrating a configuration of a wireless terminal 500 and application functions provided in the wireless terminal 500 according to the second embodiment of the invention.

In the second embodiment of the invention, the user's wireless terminal 500 having the capacitive touch screen 505 recognizes a stamp touch using the touch stamp 200 having N touch units 300 and authenticates the stamp touch using a pre-registered touch authentication condition.

In the second embodiment, instead of the information transmitting unit and the authentication result receiving unit out of the application functions illustrated in FIG. 5, a touch authentication condition of a specific authentication target touch stamp 200 out of touch authentication conditions of the touch authentication system 600 illustrated in FIG. 6 is stored, and the touch point authenticating unit 630, the touch point identification unit 635, the position relation calculating unit 640, and the touch authentication processing unit 645 illustrated in FIG. 6 may be functionally implemented in the application.

In the second embodiment, the touch authentication condition provided in the wireless terminal 500 may be stored as a program code in the application or a data type stored in the memory unit 514 of the wireless terminal 500, and it is preferable to selectively store a touch authentication condition of the specific authentication target touch stamp 200 to be authenticated by the application. When the touch authentication condition is stored as the data type, the touch authentication condition may download and store a touch authentication condition registered in the storage medium 610 illustrated in FIG. 6.

The touch point authenticating unit 630 reads a mutual position relation between each of N touch points based on the component value read through the stamp touch reading unit and may authenticate whether the N touch points are touch points of the valid touch stamp 200. The touch point identification unit 635 may identify the designated touch point provided in the designated position 425 on the designated area 415 out of the n partition areas 410 based on the component value read through the stamp touch reading unit.

When the unique code or the single-use code is recognized through the sound or the NFC from the touch stamp 200, the application may further include the code authenticating unit 655 illustrated in FIG. 6. The code authenticating unit 655 may authenticate the unique code or the single-use code recognized through the sound recognition unit or the NFC recognition unit.

By selectively combining the processes of FIGS. 7 to 10, those skilled in the art may construe processes of recognizing N touch points using the stamp touch, authenticating the N touch points using the touch authentication condition, and storing the touch authentication condition in the application of the wireless terminal 500. Therefore, a detailed description thereof will be omitted.

REFERENCE NUMERALS

- 100: operation server 105: relay server
- 110: terminal device 200: touch stamp
- 205: handle portion 210: spring portion
- 215: adapter portion 220: guide portion
- 225: housing portion 300: touch unit
- 305: buried plate 310: touch implementation unit
- 315: contact surface 400: flat portion
- 405: flat area 410: partition area
- 415: designated area 420: calculated position
- 425: designated position 500: wireless terminal
- 505: capacitive touch screen 520: stamp touch recognition unit
- 525: stamp touch reading unit 530: position checking unit
- 535: sound recognition unit 540: NFC recognition unit
- 545: information transmitting unit 550: authentication result receiving unit
- 555: service procedure performing unit 600: touch authentication system
- 605: authentication condition storage 610: storage medium
- 615: information receiving unit 620: touch point checking unit
- 625: position information checking unit 630: touch point authenticating unit
- 635: touch point identification unit 640: position relation calculating unit
- 645: touch authentication processing unit 650: code checking unit
- 655: code authenticating unit

The invention claimed is:

1. A method of authenticating a stamp touch that is executed in a wireless terminal having a capacitive touch screen which supports a multi-touch, the method comprising:
    recognizing multi-touched multiple touch points made of a conductive material on the capacitive touch screen;
    checking whether the number of touch points is matched with the number of touch units provided in a touch stamp when two or more touch points are touched;
    determining the recognized touch points as the touch points which touched by the touch stamp when the checked number of touch points is matched with the number of touch units provided in the touch stamp;
    authenticating a result of analyzing whether a geometrical position relation formed by the recognized touch points matches a designed geometrical position relation of touch units provided in a reference touch stamp within an allowed error tolerance by using designed geometrical position relations including a distance relation and an angle relation of touch units, wherein the reference touch stamp comprises at least four partition areas comprising at least one pre-designated partition area and other remaining partition areas and at least five touch units comprising one pre-designated touch unit which is a reference point positioned in the one pre-designated partition area and other remaining touch units, wherein the one pre-designated partition area comprises the at least one predesignated touch unit and at least one of the other remaining touch units, and each of the other remaining partition areas comprises at least one of the other remaining touch units;
    identifying the geometrical position relation of the touch units provided in the reference touch stamp; and
    starting a designated service linked with the reference touch stamp when the geometrical position relation formed by the recognized touch points is matched with the designed geometrical position relation of the reference touch stamp,
    wherein the designed geometrical position relations include the distance relation and the angle relation between the at least one predesignated touch unit and the at least one of the other remaining touch units.

2. The method of claim 1, further comprising:
    repeatedly recognizing two or more touch points when the points are recognized through the capacitive touch screen in a designated time interval;
    checking whether the number of touch points is matched with the number of touch units provided in the touch stamp that are touched within a designated certain time from when the two or more touch points are initially recognized; and
    determining the recognized touch points as the touch points which touched by the touch stamp when the checked number of touch points is matched with the number of touch units provided in the touch stamp within the certain time.

3. The method of claim 1, further comprising:
    repeatedly recognizing touched touch points recognized through the capacitive touch screen in a designated time interval;
    checking whether the number of touch points that are repeatedly recognized for the certain time is matched with the number of touch units provided in the touch stamp; and
    determining the recognized touch points as touch points that are touched by a behavior habit of stamping the stamp when the number of repeatedly checked touch points is matched with the number of touch units provided in the touch stamp.

4. The method of claim 1, further comprising:
    repeatedly recognizing touched touch points recognized through the capacitive touch screen in a designated time interval;

repeatedly checking positions of the repeatedly recognized touch points;
checking whether the positions of the touch points maintain a static state without change by comparing the positions of the repeatedly checked touch points for each point; and
determining the touch points as touch points that are touched by a behavior habit of stamping the stamp when the positions of the touch points are not changed.

5. The method of claim 1, further comprising:
repeatedly recognizing touched touch points recognized through the capacitive touch screen in a designated time interval;
repeatedly checking a position relation of the repeatedly recognized touch points;
comparing the position relation of the repeatedly checked touch points and checking whether the position relation of the touch points maintains a static state without change; and
determining the touch points as touch points that touched touch units provided in the touch stamp when the touched the position relation of the touch points maintains a static state.

6. The method of claim 1, further comprising:
repeatedly recognizing touched touch points recognized through the capacitive touch screen in a designated time interval;
repeatedly checking positions of the repeatedly recognized touch points;
comparing positions of the repeatedly checked touch points and checking whether a position relation of the touch points has a dynamic state that is changed based on a designated rule; and
determining the touch points as touch points that are touched using the touch stamp having touch units which are movably designed and manufactured based on the designated rule when the position relation of the touch points has a dynamic state.

7. The method of claim 1, further comprising:
repeatedly recognizing touch points that are touched on the capacitive touch screen from when at least one touch point is recognized through the capacitive touch screen;
repeatedly checking the number and positions of touch points while the touch points are repeatedly recognized;
reading a change of the number of repeatedly checked touch points and positions of the touch points, and checking whether the touch points are sequentially touched based on a designated rule; and
determining the touch points as touch points that are touched using the touch stamp having touch units which are designed and manufactured to be sequentially touched based on the designated rule when the touch points are sequentially touched based on the designated rule.

8. The method of claim 1, further comprising:
reading a component value of the touch points recognized through the capacitive touch screen; and
transmitting touch recognition information including the read component value to an operation server over a network through a designated path,
wherein in the authenticating the result, a touch authentication result of authenticating whether the geometrical position relation of the touch points is matched with the designed geometrical position relation of touch units provided in the touch stamp within an allowed error tolerance.

9. The method of claim 1, further comprising:
storing a touch authentication condition including a designed geometrical position relation of the touch units including at least a distance relation and an angle relation provided in the touch stamp;
reading a component value of touch points recognized through the capacitive touch screen;
calculating a geometrical position relation of the touch points touched on the capacitive touch screen using the component value; and
analyzing whether the designed geometrical position relation included in the touch authentication condition and the calculated geometrical position relation are matched within an allowed error tolerance.

10. The method of claim 1, wherein the reference touch stamp further comprises a margin between the at least four partition areas.

11. The method of claim 1, wherein the at least one pre-designated touch unit is positioned at a corner or side of the reference touch stamp.

12. A method of authenticating a stamp touch that is executed with a capacitive touch screen which supports a multi-touch, the method comprising:
storing in a non-transitory storage medium a touch authentication condition including a designed geometrical position relation including at least one selected from a group of a distance relation and an angle relation of multiple touch units provided in a reference touch stamp, wherein the reference touch stamp comprises at least four partition areas comprising at least one pre-designated partition area and other remaining partition areas and at least five touch units comprising one pre-designated touch unit which is a reference point positioned in the one pre-designated partition area and other remaining touch units, wherein the one pre-designated partition area comprises the at least one pre-designated touch unit and at least one of the other remaining touch units, and each of the other remaining partition areas comprises at least one of the other remaining touch units;
receiving touch recognition information including a component value of the touch units that are provided in the touch stamp touched on the capacitive touch screen;
calculating a geometrical position relation of touch points touched on the capacitive touch screen using the component value included in the touch recognition information;
analyzing whether the calculated geometrical position relation is matched with the designed geometrical position relation included in the touch authentication condition within an error tolerance; and
generating a touch authentication result of analyzing whether the calculated geometrical position relation is matched with the designed geometrical position relation included in the touch authentication condition within an error,
wherein the designed geometrical position relations include the distance relation and the angle relation between the at least one predesignated touch unit and the at least one of the other remaining touch units.

13. The method of claim 12, wherein the component value includes a coordinate value in a coordinate system corresponding to the capacitive touch screen.

14. The method of claim 12, further comprising:
setting and storing a minimum-distinction-recognition distance in which the touch units provided in the touch stamp can be distinctly recognized as different touch points; and
calculating a distance between the touch points touched on the capacitive touch screen using a component value included in the touch recognition information and authenticating whether the calculated distance between the touch points is over the minimum-distinction-recognition distance.

15. The method of claim 12, wherein the designed geometrical position relation further includes a coordinate relation of the touch units provided in the touch stamp in the course of designing or manufacturing the touch stamp.

16. The method of claim 12, wherein the touch stamp is designed and manufactured such that a designated touch unit which is one of touch units positioned in a pre-designed fixed position and the other touch units are positioned in the designed calculated position.

17. The method of claim 12, further comprising:
checking position information of the wireless terminal that has transmitted the touch recognition information; and
checking a touch authentication condition that is mapped with position information that matches the position information of the wireless terminal and stored out of touch authentication conditions stored in the non-transitory storage medium as a comparison target touch authentication condition,
wherein the touch authentication condition is mapped with position information of a stamp-using client provided with the touch stamp and stored.

18. The method of claim 12, further comprising:
reading a mutual position relation between touch points using the component value included in the touch recognition information; and
authenticating whether the mutual position relation between the touch points includes a position relation that can be formed by touching touch units of the designed and manufactured touch stamp on the capacitive touch screen.

19. The method of claim 12, further comprising comparably matching the component value with the designed geometrical position relation included in the touch authentication condition by performing coordinate rotation of the touch points based on the designated touch point.

20. The method of claim 12, further comprising:
when the touch recognition information includes a unique code or a single-use code encoded in a sound signal,
checking the unique code or the single-use code included in the touch recognition information; and
authenticating validity of the checked unique code or single-use code using an authentication condition of the touch authentication condition,
wherein the touch authentication condition further includes an authentication condition for authenticating the unique code or the single-use code encoded in a sound signal output through a sound output function provided in the touch stamp, and
the analyzing whether the calculated geometrical position relation is matched with the designed geometrical position relation includes generating a touch authentication result combining the result of the geometrical position relation of the touch points and an authentication result of the unique code or single-use code are combined.

21. The method of claim 12, further comprising
when the touch recognition information includes a unique code or a single-use code received from the NFC chip,
checking the unique code or the single-use code included in the touch recognition information; and
authenticating validity of the checked unique code or single-use code using an authentication condition of the touch authentication condition,
wherein the touch authentication condition further includes an authentication condition for authenticating a unique code or a single-use code encoded in a radio frequency signal transmitted through an NFC chip included in the touch stamp, and
the analyzing whether the calculated geometrical position relation is matched with the designed geometrical position relation includes generating a touch authentication result combining the result of the geometrical position relation of the touch points and an authentication result of the unique code or single-use code are combined.

22. A system for authenticating a stamp touch that is implemented in an operation server capable of receiving touch recognition information of a touch point touched on a capacitive touch screen provided in a wireless terminal, the system comprising:
an authentication condition storage configured to store a touch authentication condition including a designed geometrical position relation including at least one selected from a group of a distance relation and an angle relation of touch units that are provided in the touch stamp and made of a conductive material in a non-transitory storage medium;
an information receiving unit configured to receive touch recognition information including a component value of the touch units that are provided in the touch stamp and are touched on the capacitive touch screen;
a position relation calculating unit configured to calculate an authentication target geometrical position relation of touch points touched on the capacitive touch screen using the component value included in the touch recognition information; and
a touch authentication processing unit configured to generate a touch authentication result which analyzed the calculated geometrical position relation is matched within an error tolerance with the designed geometrical position relation included in the touch authentication condition,
wherein the touch stamp comprises at least four partition areas comprising at least one pre-designated partition area and other remaining partition areas and at least five touch units comprising one pre-designated touch unit which is a reference point positioned in the one pre-designated partition area and other remaining touch units, wherein the one pre-designated partition area comprises the at least one pre-designated touch unit and at least one of the other remaining touch units, and each of the other remaining partition areas comprises at least one of the other remaining touch units,
wherein the designed geometrical position relations include the distance relation and the angle relation between the at least one predesignated touch unit and the at least one of the other remaining touch units.

\* \* \* \* \*